(12) United States Patent
Fujii et al.

(10) Patent No.: US 7,765,602 B2
(45) Date of Patent: Jul. 27, 2010

(54) STORAGE ON-DEMAND SYSTEM, AND METHOD FOR PROCESSING DATA IN THE SAME

(75) Inventors: Tetsuhiko Fujii, Odawara (JP); Hisashi Takamatsu, Odawara (JP); Hideo Tabuchi, Odawara (JP)

(73) Assignee: Hitachi, Ltd, Tokyo (JP)

( * ) Notice: Subject to any disclaimer, the term of this patent is extended or adjusted under 35 U.S.C. 154(b) by 901 days.

(21) Appl. No.: 11/635,037

(22) Filed: Dec. 7, 2006

(65) Prior Publication Data

US 2008/0083038 A1    Apr. 3, 2008

(30) Foreign Application Priority Data

Oct. 3, 2006    (JP)    ............... 2006-271446

(51) Int. Cl.
*H04L 9/00* (2006.01)
*H04L 9/32* (2006.01)
*G06F 12/00* (2006.01)

(52) U.S. Cl. .................. 726/27; 713/166; 713/190; 713/192; 713/194; 726/16; 726/17; 726/18; 726/19

(58) Field of Classification Search .................. 726/27
See application file for complete search history.

(56) References Cited

U.S. PATENT DOCUMENTS 6,115,819 A * 9/2000 Anderson .................. 726/20
6,711,656 B2    3/2004 Nishio et al.
2003/0236790 A1    12/2003 Honmura et al.
2004/0199787 A1 * 10/2004 Hans et al. ................. 713/200

FOREIGN PATENT DOCUMENTS

JP    2003-30013    7/2001
JP    2004-21796    6/2002

* cited by examiner

*Primary Examiner*—Longbit Chai
(74) *Attorney, Agent, or Firm*—Foley & Lardner LLP

(57) ABSTRACT

Data in a storage area to be returned from among storage areas of a storage system is deleted without fail, thereby ensuring data security.

When a user's storage-on-demand management program 24 is activated in response to a return request from user A's console terminal 18, the return request is transferred via a communication network 14 to a server 16, and a provider's storage on-demand management program 30 makes a request to a storage management program 32 for volume initialization and data deletion. After the storage management program 32 issues a volume initialization command after receiving the above request, a control program 76 is activated to initialize the designated volume. Subsequently, the user A's volume access right is deleted by the processing executed by the provider's storage-on-demand management program 30, and it is reported to the console terminal 18 that the volume initialization and the volume separation have been conducted.

6 Claims, 21 Drawing Sheets

FIG.3

| VOLUME ID | ASSIGNED FLAG | USER NUMBER | ASSIGNED DATE | VOLUME TYPE INFORMATION | INITIALIZED FLAG |
|---|---|---|---|---|---|
| 0000 | 1 | 001 | 2006/4/1 | 10GBTYPE | 0 |
| 0002 | 1 | 001 | 2006/4/1 | 10GBTYPE | 0 |
| 0001 | 1 | 002 | 2006/5/1 | 10GBTYPE | 0 |
| 0003 | 1 | 002 | 2006/6/1 | 10GBTYPE | 0 |
| ... | ... | ... | ... | ... | ... |

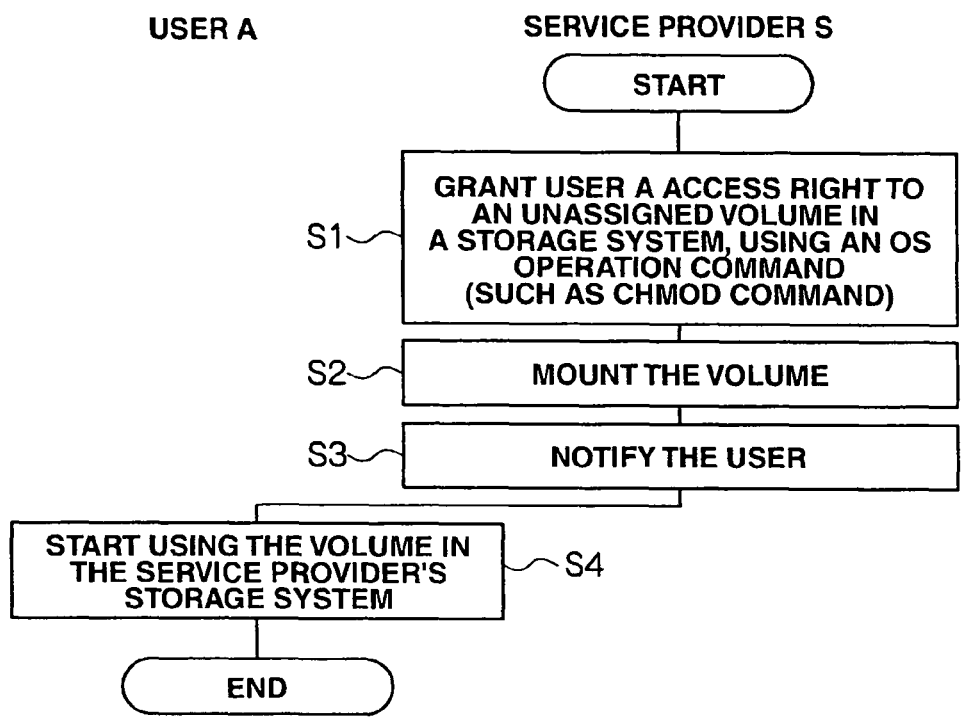
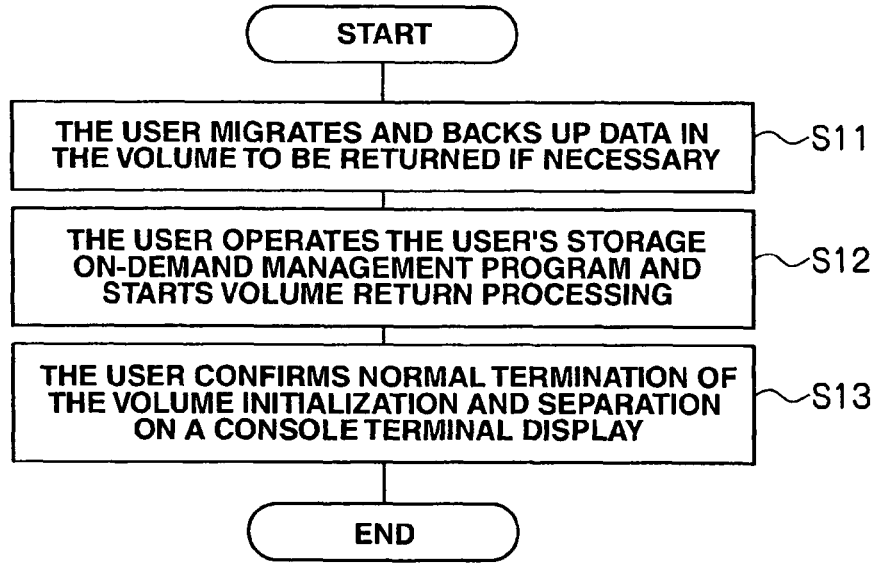

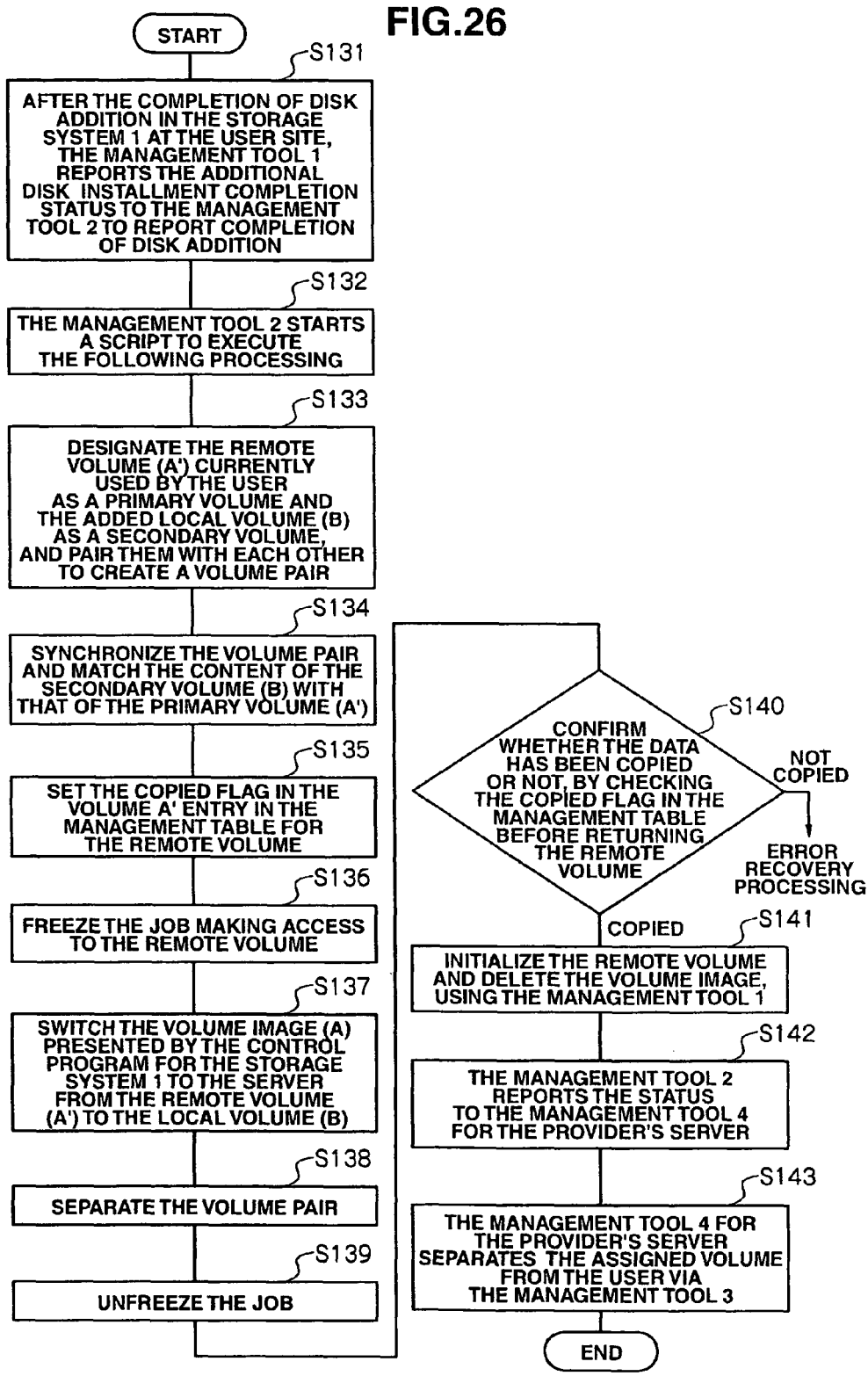

STORAGE ON-DEMAND SYSTEM, AND METHOD FOR PROCESSING DATA IN THE SAME

CROSS-REFERENCES TO RELATED APPLICATIONS

This application relates to and claims priority from Japanese Patent Application No. 2006-271446, filed on Oct. 3, 2006, the entire disclosure of which is incorporated herein by reference.

BACKGROUND

1. Field of the Invention

The present invention relates to a technique for ensuring data security in a system that realizes provision of on-demand storage areas.

2. Description of Related Art

Through the widespread use of the Internet these days, storage services for providing storage areas to users via a network are provided. Using this service, a user does not have to purchase, maintain, or manage a storage system by himself. If it becomes no longer necessary to use the storage system, all the user has to do is to terminate a contract with a service provider. Accordingly, the user can utilize the storage system easily. Recently, there has also been a storage on-demand service that allows a user to easily use a storage system in any required capacity whenever necessary and charges the user for as much storage system as they used.

For example, a storage operation method is suggested by which, if it is found that the remaining storage area capacity of a user's storage system has become less than a specified value, a storage area in a remote storage system connected via a specified communication means to the user's storage system is made available as a storage area for the user's storage system (see JP-A-2003-30013).

Furthermore, a storage service method, a storage service program, and a storage apparatus that can easily set storage use capacity as desired by the user and charge a usage fee to the user for the actually used storage capacity have been suggested (see JP-A-2004-21796).

If a service provider provides a storage area to a user via a network, and if the user terminates a storage use contract or reduces the storage capacity provided by the service provider, the service provider will provide that storage area, which is no longer used by the user, to another user as a matter of course. In this case, information stored in the storage area by the former user will be deleted without fail, so even if that storage area is reassigned to another user, the former user's data will never be read or viewed by the new user.

SUMMARY

It is an object of this invention to provide a storage system capable of ensuring data security by reliably deleting data in a storage area to be returned from among storage areas in the storage system.

In order to achieve the above object, according to an aspect of the invention, a storage on-demand system for providing some storage areas in a storage system to a user terminal upon a request from the user terminal is provided. This storage on-demand system is characterized in that processing for assigning a storage area to the storage system or return processing is terminated on the condition that data in the storage area to be returned or assigned from among storage areas of the storage system is deleted.

When deleting data in the storage area to be returned or assigned, processing for initializing a designated volume and nullifying an access right to the designated volume can be executed as a single continuous processing sequence according to the invention. In this case, both the initialization processing and the nullification processing are executed in that order, thereby ensuring data security, and also making the user feel secure in the belief that the data deletion will be conducted without fail when returning the storage area.

According to the invention, a storage system capable of ensuring data security by reliably deleting data in a storage area to be returned from among storage areas of the storage system can be provided.

BRIEF DESCRIPTION OF THE DRAWINGS

FIG. 3 is a configuration diagram of a volume information management table.

FIG. 4 is a flowchart explaining storage area assignment operation processing.

FIG. 5 is a flowchart explaining storage area return operation processing.

FIG. 26 is a flowchart explaining other automatic storage switching processing according to the sixth embodiment.

DETAILED DESCRIPTION OF PREFERRED EMBODIMENTS

Embodiments of the invention will be explained below with reference to the attached drawings. The first embodiment adopts a connection mode in which the user's servers are connected via a network to a service provider's server, and the service provider's server is connected to a storage system.

Figure 1:
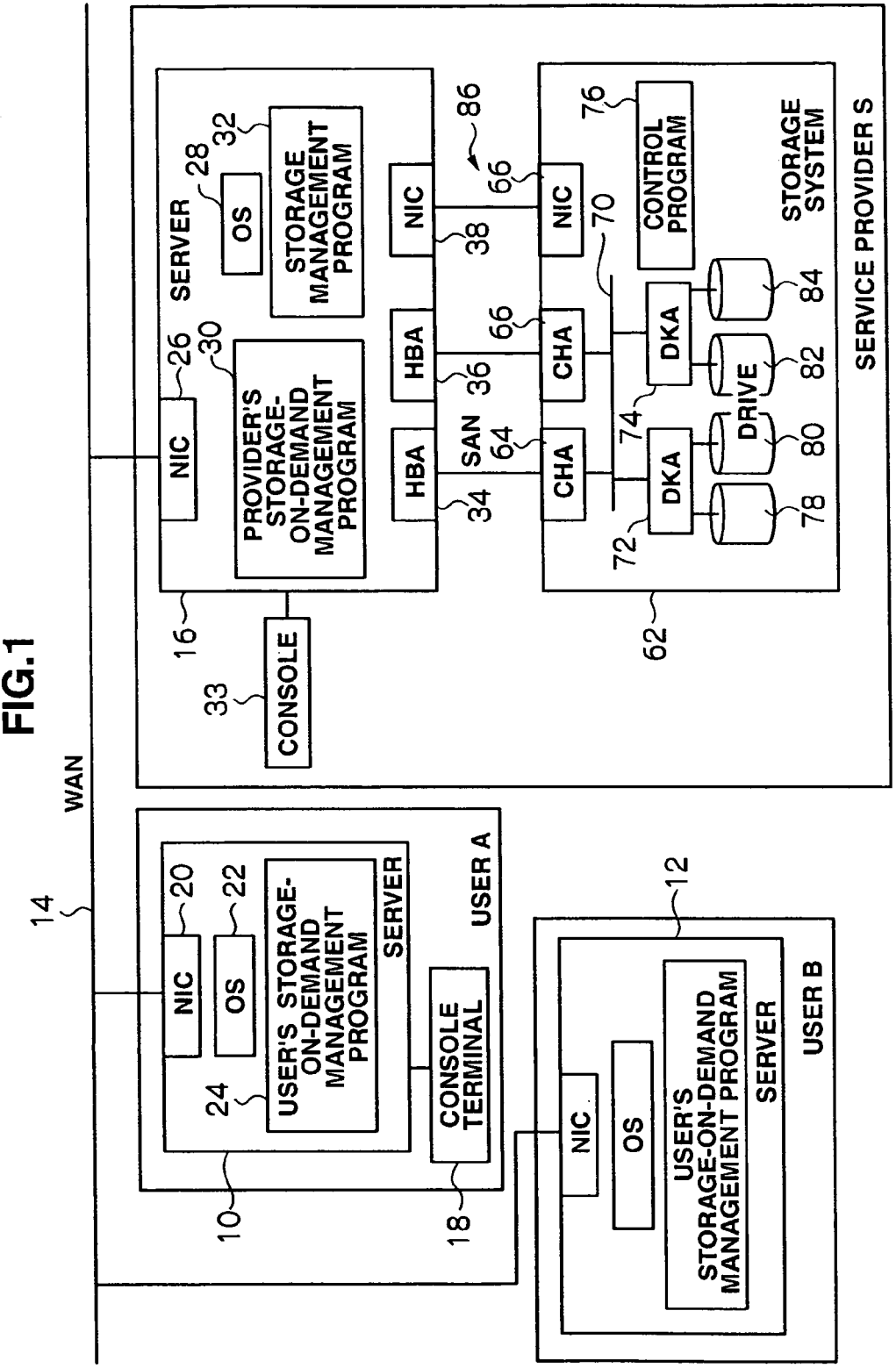
FIG. 1 is a system configuration diagram of a storage on-demand system according to the first embodiment of the present invention.

FIG. 1 is a system configuration diagram of a storage-on-demand system according to the first embodiment of the invention. Referring to FIG. 1, a server 10 used by user A and a server 12 used by user B are connected via a communication network 14, such as a WAN (Wide Area Network), to a server 16 under the control of a service provider S. Since the server 10 and the server 12 have the same configuration, only the server 10 used by user A will be described below. The server 10 is connected to user A's console terminal 18. The console terminal 18 is composed of a user terminal for user A and equipped with, for example, a keyboard, a personal computer, and a display device.

The server 10 includes: an NIC (Network Interface Card) 20 connected to the communication network 14, as an element of a communication unit; a computer (not shown) that functions as a return request processing unit and a user terminal processing unit; an OS (Operating System) 22 for managing programs and data; and a user's storage-on-demand management program 24.

Figure 2:
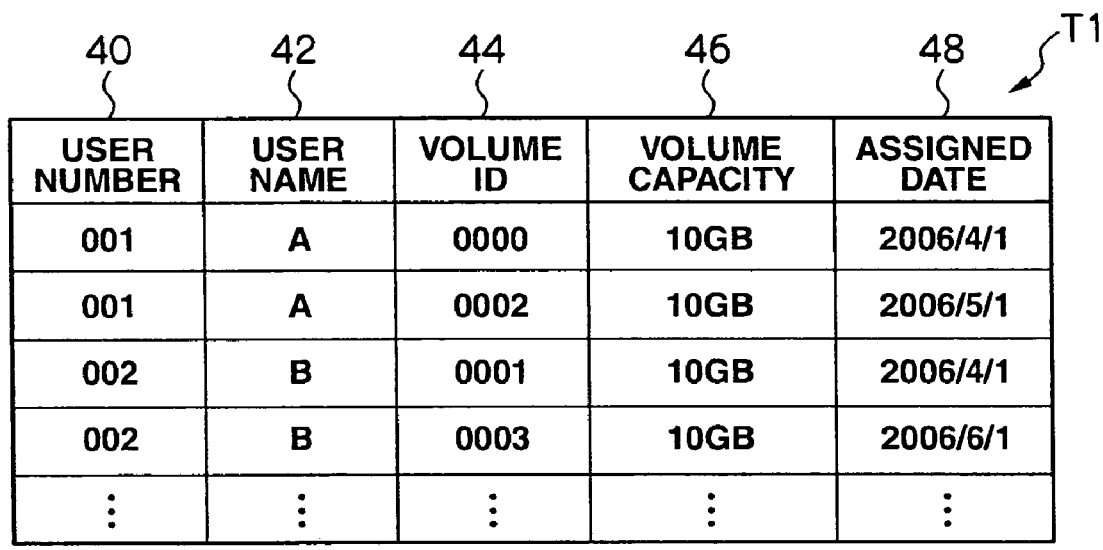
FIG. 2 is a configuration diagram of a user information management table.

Meanwhile, the server 16 includes an NIC 26, an OS 28, a provider's storage-on-demand management program 30, a storage management program 32, HBAs (Host Bus Adapters) 34 and 36, an NIC 38, and a database (not shown). The server 16 also includes a computer (not shown) that functions as an initialization processing unit and an access right processing unit. This computer is connected to a console 33. The database stores data regarding a user information management table T1 shown in FIG. 2 and data regarding a volume information management table T2 shown in FIG. 3. The user information management table T1 stores data regarding a user number 40, a user name 42, a volume ID (Identification) 44, a volume capacity 46, and an assigned date 48. The volume information management table T2 stores data regarding a volume ID 50, an assigned flag 52, a user number 54, an assigned date 56, volume type information 58, and an initialized flag 60.

The server 16 is connected to a storage system 62. The storage system 62 includes CHAs (Channel Adapters) 64 and 66, an NIC 68, a bus 70, DKAs (Disk Adapters) 72 and 74, a control program 76, and disk drives 78, 80, 82, and 84. The CHAs 64 and 66 and the NIC 68 are connected via a communication network 86, such as a SAN (Storage Area Network), to the HBAs 34 and 36 and the NIC 38 respectively.

When configuring the storage-on-demand system for providing some storage areas of the storage system 62 to the console terminal 18 in response to a request from the console terminal 18, the service provider S assigns the storage system 62 to user A. As specifically shown in FIG. 4, the service provider S operates the console 33 and uses an OS 28 operation command of the server 16, such as the UNIX® operating system chmod (change mode) command, to grant the user A an access right to an unassigned volume in the storage system 62 (S1). In this case, the service provider S displays the volume information management table T2 information on the screen and finds the volume ID 50 whose assigned flag is "0," and grants the right to access user A to this volume. Subsequently, the service provider S performs the operation to mount the volume with the access right to the server 16 (S2). Then, the service provider S performs the operation to notify user A of information about the volume for which the access right was granted (S3). After receiving the provision of some storage areas of the storage system 62, user A can use the designated volume by operating the console terminal 18 (S4).

Figure 6:
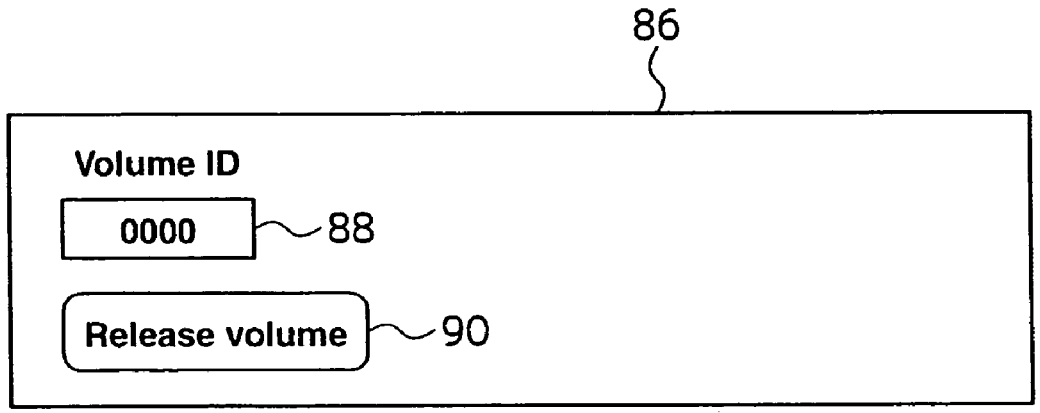
FIG. 6 shows an example of a volume release request screen.

If it becomes necessary for user A to return the volume in the storage system 62 to the service provider S, user A can perform the following return operation. As shown in detail in FIG. 5, when releasing and returning the storage area to the service provider S, user A performs, if necessary, the operation to migrate and back up data in the volume to be returned using the console terminal 18 (S1 1). User A then operates the server 10's storage-on-demand management program 24 via the console terminal 18 to start the volume return processing by designating the volume ID of the volume to be returned (S12). At that moment, a window 88 to input the volume number and a release volume button 90 are displayed on an operation screen 86 on the console terminal 18 as shown in FIG. 6. The volume return processing is executed by user A clicking the release volume button 90. Then, the user's storage-on-demand management program 24 on the server 10 starts the volume return processing. This return processing is performed as described later in detail. When the return processing terminates normally, the operation screen on the console terminal 18 displays that the volume initialization and separation has terminated normally. Accordingly, user A can confirm normal termination of the volume initialization and separation (S13).

Figure 7:
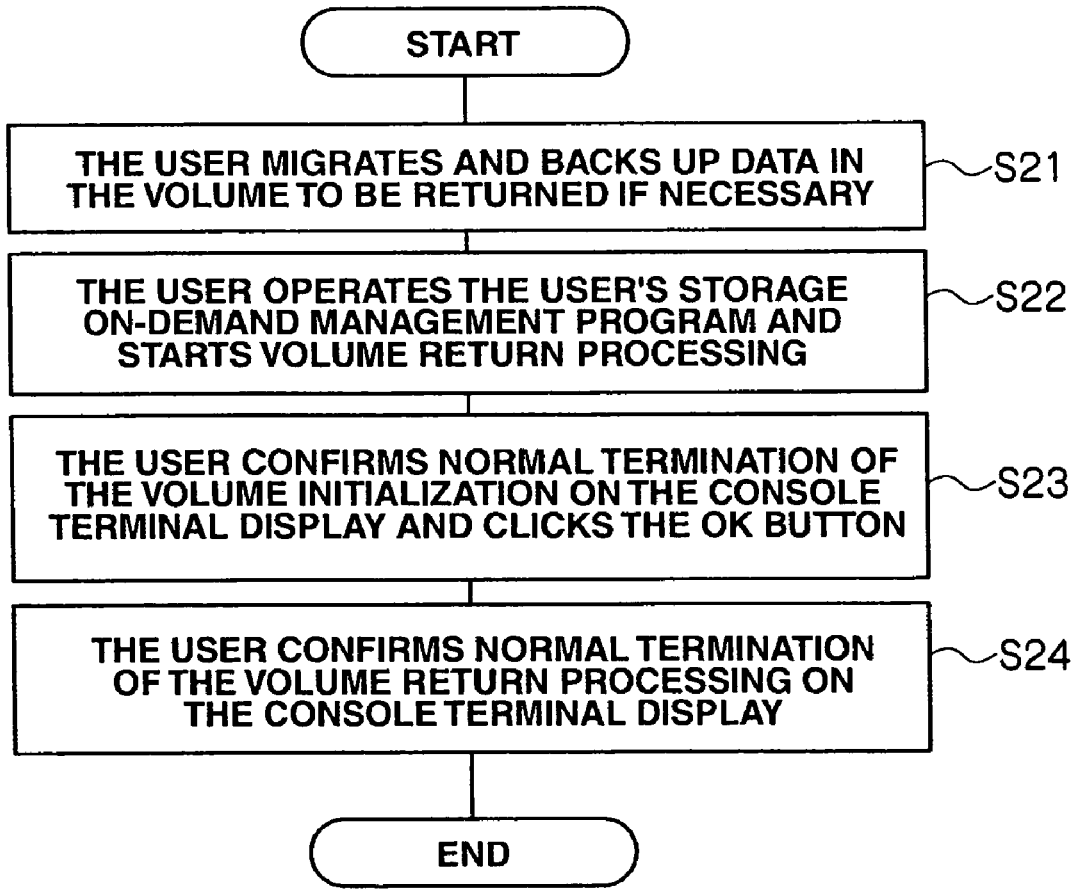
FIG. 7 is a flowchart explaining storage area return operation processing.
Figure 8:
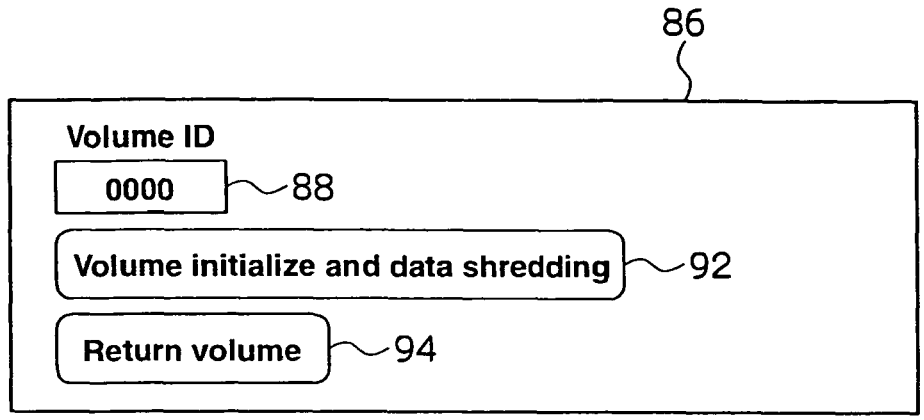
FIG. 8 shows an example of a volume initialization request screen.

On the other hand, the following return operation is performed in order to execute the volume initialization processing and the separation processing separately and have user A order the volume separation after user A confirms the completion of the volume initialization on the operation screen. As shown in detail in FIG. 7, if necessary, user A performs the operation to migrate and back up data in the volume to be returned (S21). User A then operates the storage-on-demand management program 24 on the server 10 via the console terminal 18 to start the volume return processing by designating the volume ID of the volume to be returned (S22). At that moment, the window 88 to input the volume number/letters 92 requesting volume initialization, and a return volume button 94 are displayed on the console terminal 18's operation screen 86 as shown in FIG. 8. When user A clicks the return volume button 94, the storage-on-demand management program 24 activates the volume initialization processing.

Figure 9:
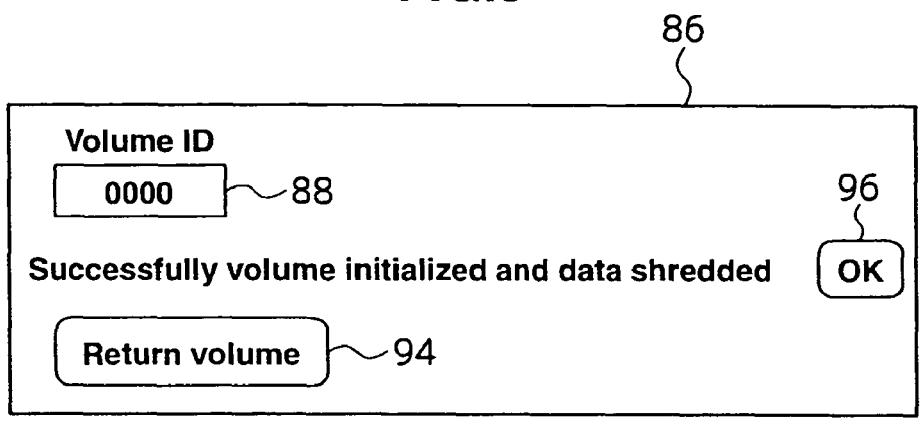
FIG. 9 shows an example of a volume initialization confirmation screen.
Figure 10:
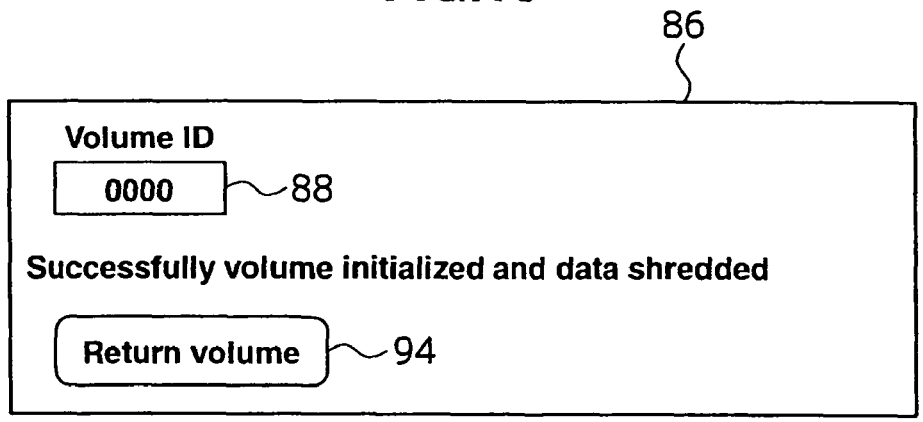
FIG. 10 shows an example of a volume separation request screen.

The initialization processing will be described later in detail. When the volume initialization processing terminates normally, the window 88 in which the volume ID is displayed, and the letters indicating termination of the volume initialization are displayed as a volume initialization confirmation screen on the console terminal 18's operation screen 86 as shown in FIG. 9. When user A confirms the normal termination of the initialization processing, user A clicks the OK button 96 (S23). Subsequently, as shown in FIG. 10, the window 88 to input the volume ID and the return volume button 94 are displayed as a volume separation request screen on the console terminal 18's operation screen 86. When this screen is displayed and if user A clicks the return volume button 94, the volume separation processing is activated. When the volume separation processing terminates normally, the operation screen on the console terminal 18 displays that the volume return processing has terminated normally. Accordingly, user A can confirm normal termination of the volume return processing (S24), and the routine for returning the storage area is terminated.

Figure 11:
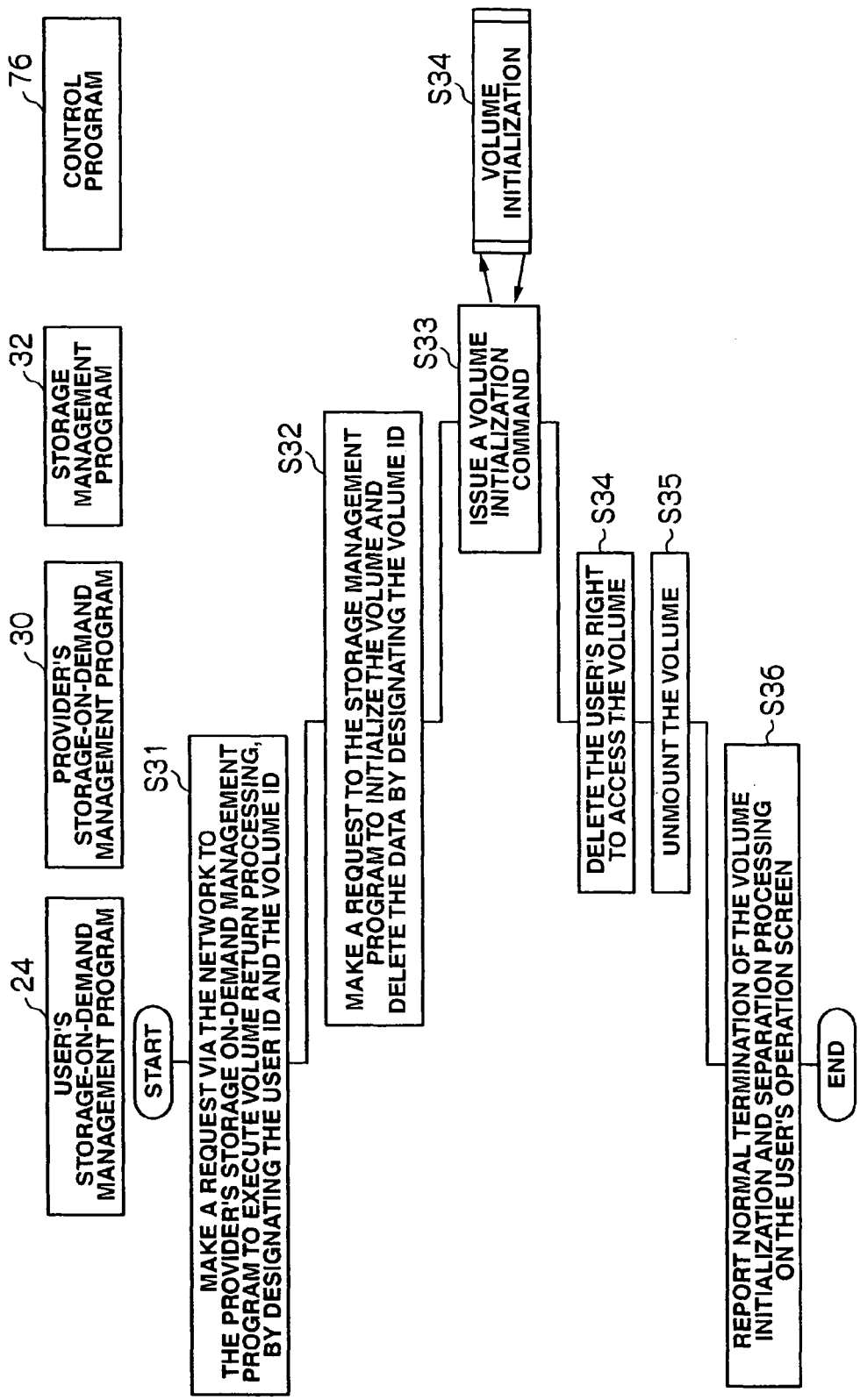
FIG. 11 is a flowchart explaining volume return processing.

Next, volume return processing for performing the volume initialization and separation at the same time will be explained below with reference to the flowchart in FIG. 11. First, the storage-on-demand management program 24 on the server 10 makes a request via the communication network 14 to the storage-on-demand management program 30 to execute the volume return processing, by designating the user ID and the volume ID in response to a return request to release the volume designated from among volumes assigned to the storage system 62 (S31). In this case, a release command or a release request function can be adopted as the return request.

Subsequently, the provider's storage-on-demand management program 30 makes a request to the storage management program 32 to initialize the volume and delete the relevant data by designating the volume ID (S32). The storage management program 32 generates a volume initialization command and issues the generated volume initialization command to the storage system 62 (S33). After receiving the initialization command, the storage system 62's control program 76 initializes the designated volume and returns the initialization results to the storage management program 32 (S34). Then, the storage-on-demand management program 30 executes processing for nullifying the access right by deleting the user A's access right to the designated volume (S34).

Furthermore, the storage-on-demand management program 30 unmounts the designated volume and notifies the user's storage-on-demand management program 24 of the completion of the volume separation processing (S35). Subsequently, the user's storage-on-demand management program 24 notifies the console terminal 18 that the initialization and separation of the designated volume have terminated normally (S36).

The volume initialization and separation can be performed in that order as a single continuous processing sequence and data security can be ensured with certainty by performing the above-described processing.

Figure 12:
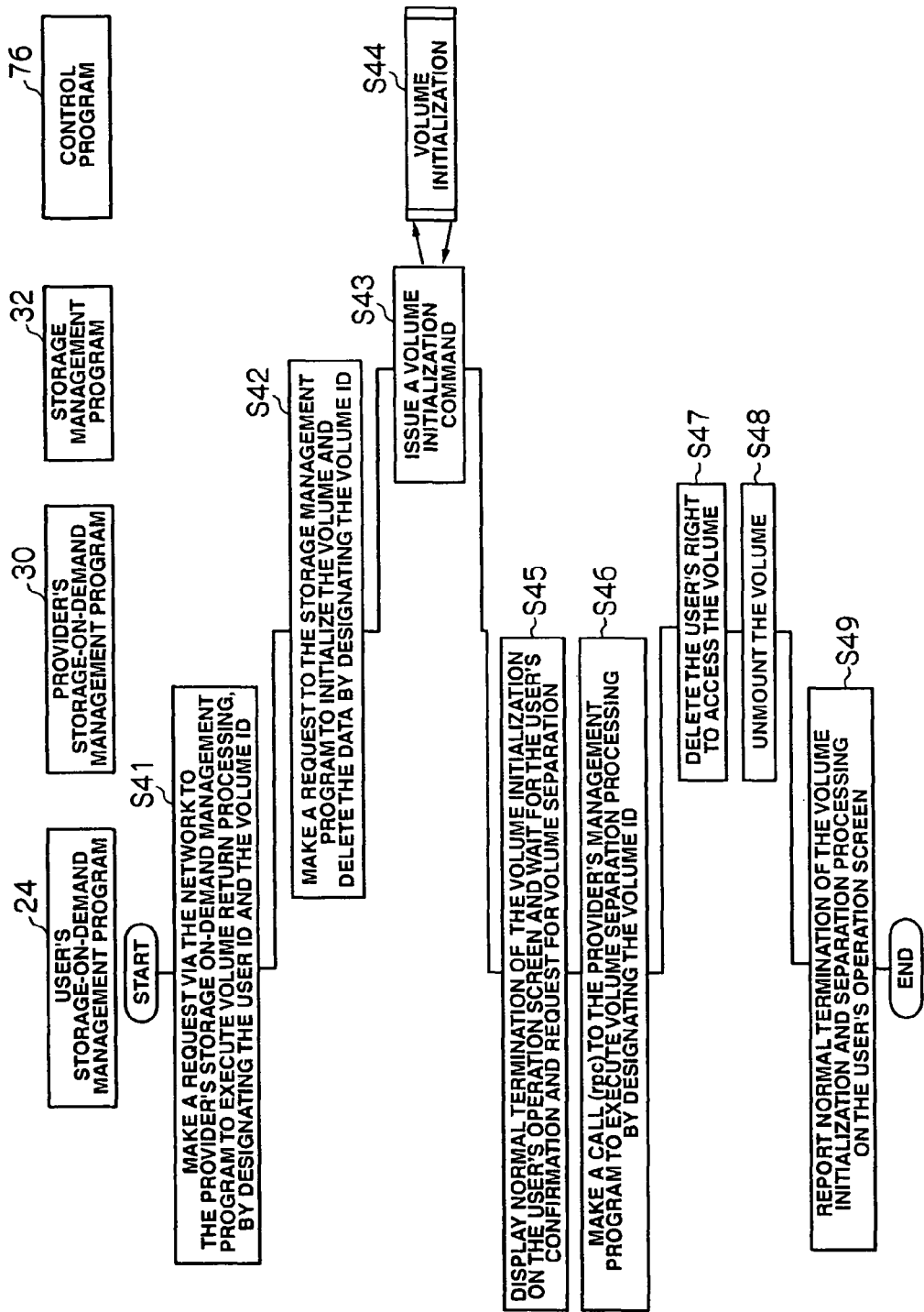
FIG. 12 is a flowchart explaining other volume return processing.

Next, the volume return processing in which the initialization processing and the separation processing for the designated volume are performed separately will be explained below with reference to the flowchart in FIG. 12. First, the user's storage-on-demand management program 24 makes a request via the communication network 14 to the provider's storage-on-demand management program 30 to execute the volume initialization processing by designating the user ID and the volume ID (S41). The provider's storage-on-demand management program 26 makes a request to the storage management program 32 to initialize the volume and delete the relevant data by designating the volume ID (S42). The storage management program 32 generates a volume initialization command to initialize the volume corresponding to the volume ID and issues the generated volume initialization command to the storage system 62 (S43). After receiving the initialization command, the control program 76 of the storage system 62 initializes the volume designated with the volume ID and deletes the data, and then notifies the storage management program 32 of the completion of the volume initialization (S44).

Upon completion of the volume initialization, the provider's storage-on-demand management program 26 reports the normal termination to the user's storage-on-demand management program 24. Consequently, the user's storage-on-demand management program 24 displays on the operation screen on user A's console terminal 18 that the volume initialization has terminated. Then, the storage-on-demand management program 24 waits for user A's confirmation and volume separation request (S45). If user A confirms the volume initialization and clicks the OK button, the user's storage-on-demand management program 24 makes a request to the provider's storage-on-demand management program 26 via the communication network 14 for the volume separation processing by designating the volume ID (S46). The provider's storage-on-demand management program 26 executes the processing for nullifying the access right by deleting the user A's access right to the designated volume (S47). Subsequently, the storage-on-demand management program 26 executes the processing for unmounting the designated volume and then notifies the user's storage-on-demand management program 24 of the completion of the volume separation processing (S48). The user's storage-on-demand management program 24 then reports the normal termination of the volume return processing to the console terminal 18, thereby terminating the processing of this routine (S49).

Since the volume separation processing is always performed after the volume initialization by adopting the above-described method, it is possible to avoid accidentally forgetting data deletion when user A returns the volume.

Figure 13:
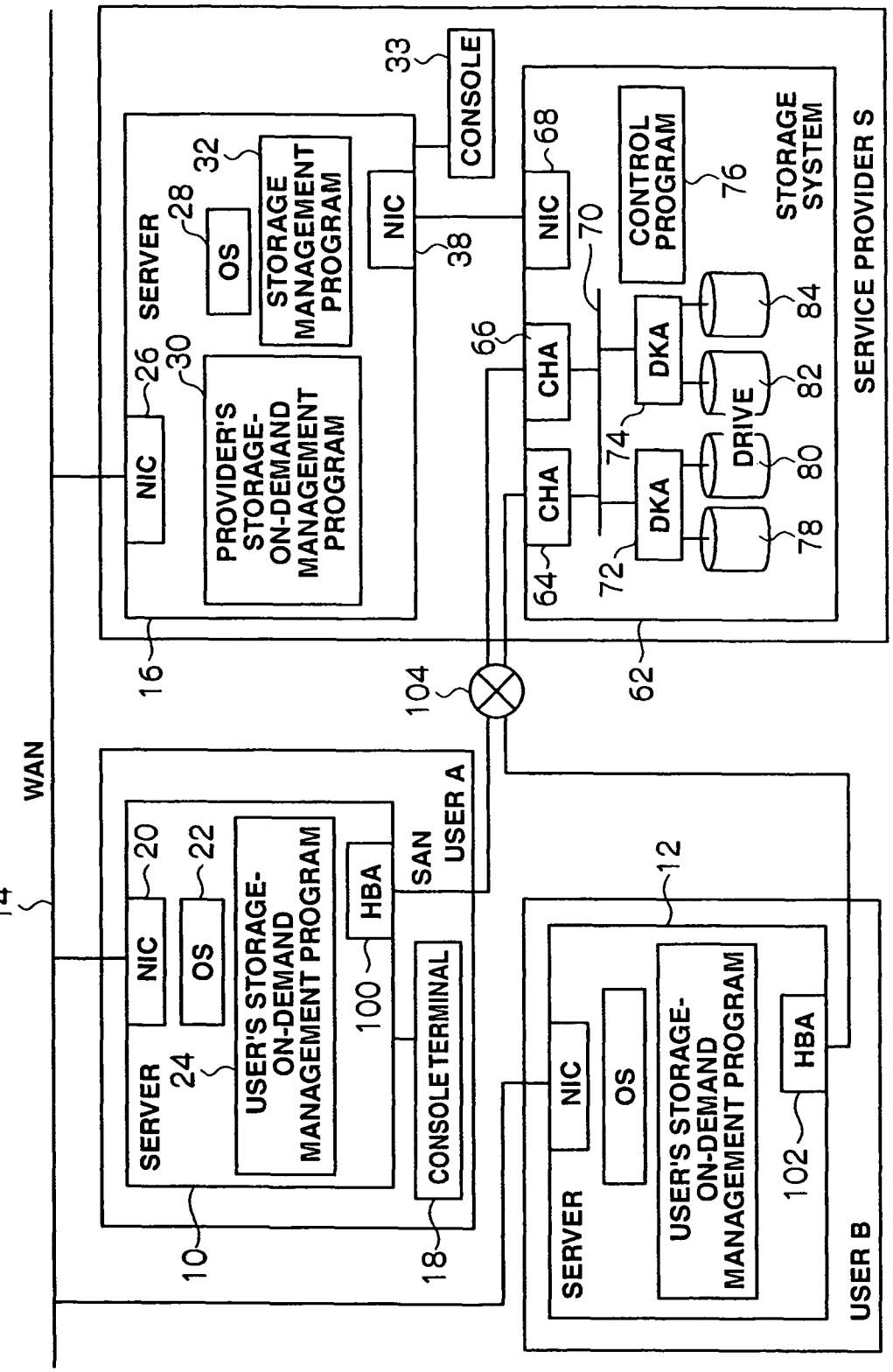
FIG. 13 is a system configuration diagram of a storage-on-demand system according to the second embodiment of this invention.

Next, the second embodiment of the invention will be explained with reference to FIG. 13. In the second embodiment, the servers 10 and 12 are equipped with HBAs 100 and 102 respectively, and the HBA 100 and 102 are directly connected to the CHAs 64 and 66 of the storage system 62 via a communication network 104 such as a SAN. Otherwise, the configuration of the second embodiment is similar to that in FIG. 1.

Figure 14:
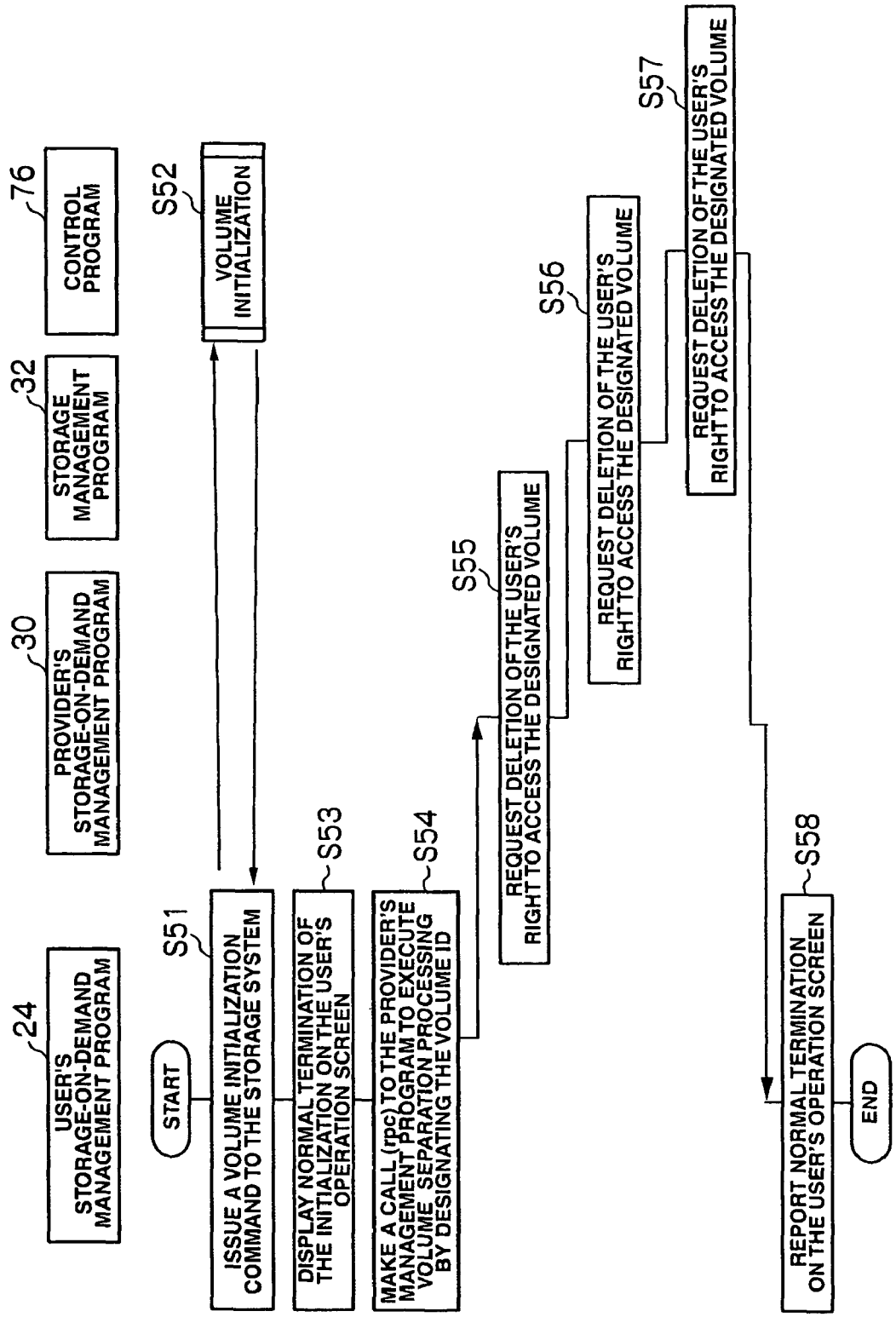
FIG. 14 is a flowchart explaining volume return processing according to the second embodiment of the invention.

Volume return processing according to the second embodiment will be explained below with reference to the flowchart in FIG. 14. After receiving a volume return request from user A, the user's storage-on-demand management program 24 generates a volume initialization command by designating a volume and sends the generated command via the communication network 104 to the storage system 62 (S51). Upon receiving the initialization command, the storage system 62 activates the control program 76 and the control program 76 initializes the designated volume according to the command. Subsequently, the control program 76 performs processing for reporting via the communication network 104 to the server 10 that the volume initialization has been performed (S52).

The user's storage-on-demand management program 24 then displays on the console terminal 18 that the volume initialization has terminated normally (S53). Subsequently, the user's storage-on-demand management program 24 makes a request via the communication network 104 to the provider's storage-on-demand management program 30 to execute volume separation processing by designating the volume ID (S54). Upon receiving the request, the provider's storage-on-demand management program 30 makes a request to the storage management program 32 for deletion of the access right for user A, the requester, to the designated volume (S55). Upon receiving that request, the storage management program 32 makes a request to the storage system 62's control program 76 for deletion of the user A's access right to the designated volume (S56). The control program 76 deletes WWN (World Wide Name) registration of the HBA 100 of the server 10 in order to delete the user A's access right to the designated volume (S57). In other words, the control program 76 deletes the user A's access right by, for example, deleting the logical access path to a connection port for the CHA 64 or 66 of the storage system 62 for the designated volume.

After deleting the user A's access right, the control program 76 performs processing for reporting the deletion of the access right via the communication network 104 to the server 10. In other words, after the user A's access right is deleted, the control program 76 sequentially reports the completion of the processing to the storage management program 32, the provider's storage-on-demand management program 30, and finally the user's storage-on-demand management program 24. Subsequently, the user's storage-on-demand management program 24 displays on the console terminal 18 that the volume separation processing has terminated normally, thereby terminating the processing sequence (S58).

Also in the case of the connection mode where the user A's server 10 is directly connected to the service provider S's storage system 62, if user A performs the operation to make a volume return request in the above-described processing, the volume initialization and the separation are performed in that order as a single continuous processing sequence. Accordingly, it is possible to avoid accidentally forgetting data deletion and ensure data security with certainty. Once user A gives a release instruction in the second embodiment, the processing for initializing and separating the volume in that order as a single continuous processing sequence is activated. However, it is also possible to adopt a method for user A to designate the volume initialization and the separation sequentially, but separately.

Figure 15:
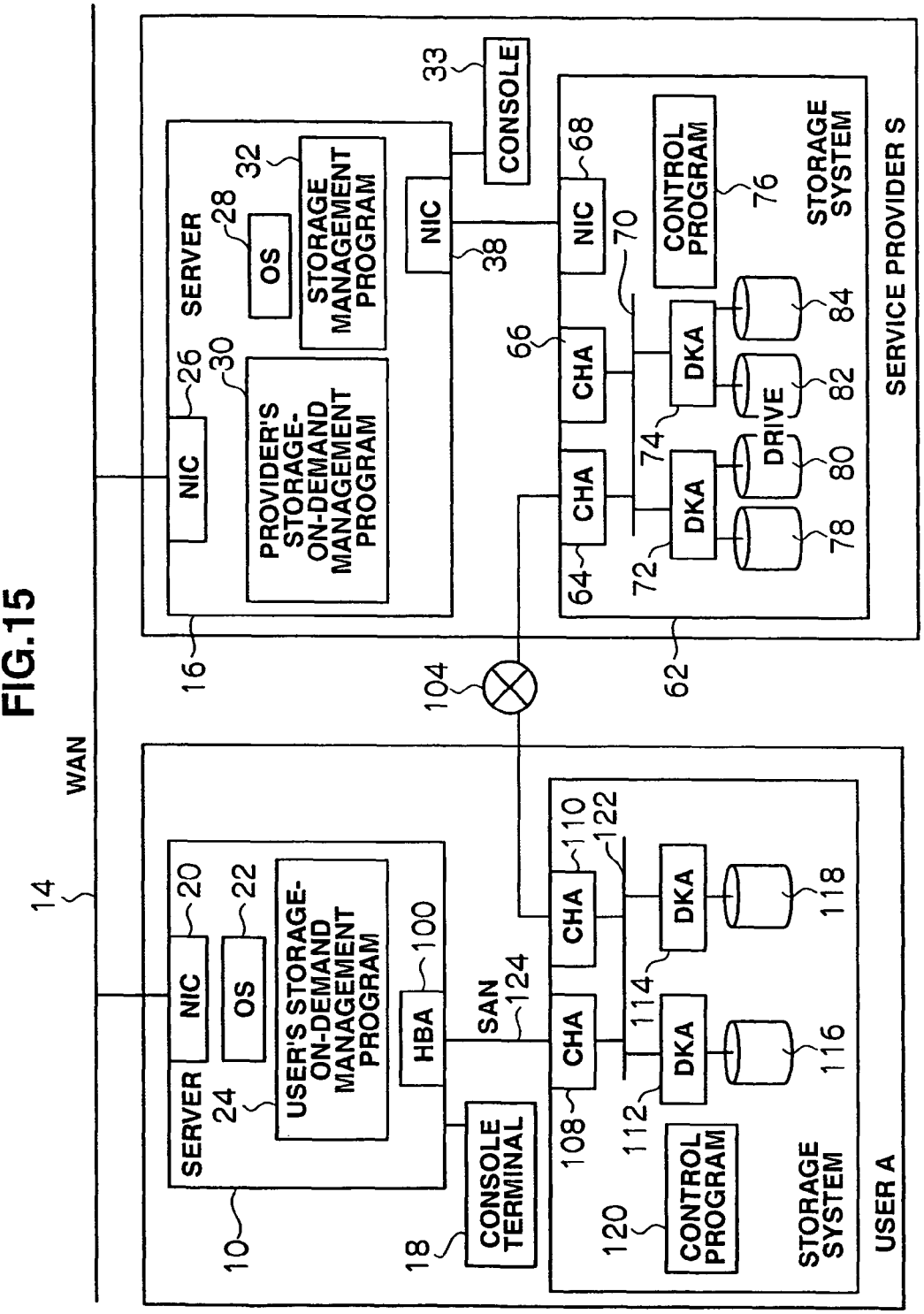
FIG. 15 is a system configuration diagram of a storage-on-demand system according to the third embodiment of the invention.

Next, the third embodiment of the invention will be explained with reference to FIG. 15. The third embodiment adopts a connection mode in which a storage system 106 to be managed by user A is provided, and this storage system 106 is directly connected via a communication network 104 to the service provider S's storage system 62. Otherwise, the configuration of the second embodiment is similar to that of FIG. 1.

The storage system 106 includes CHAs 108 and 110, DKAs 112 and 114, disk drives 116 and 118, and a control program 120. The CHAs 108 and 110 and the DKAs 112 and 114 are connected to each other via a bus 122. The CHA 108 is connected via a communication network 124, such as a SAN, to the HBA 100 of the server 10. The CHA 110 is connected via the communication network 104 to the CHA 64 of the storage system 62. The third embodiment is configured so that user A's server 10 can access a logical volume in the storage system 62 at a remote site as if that logical volume were a logical volume in the storage system 106 at the user's site.

Figure 16:
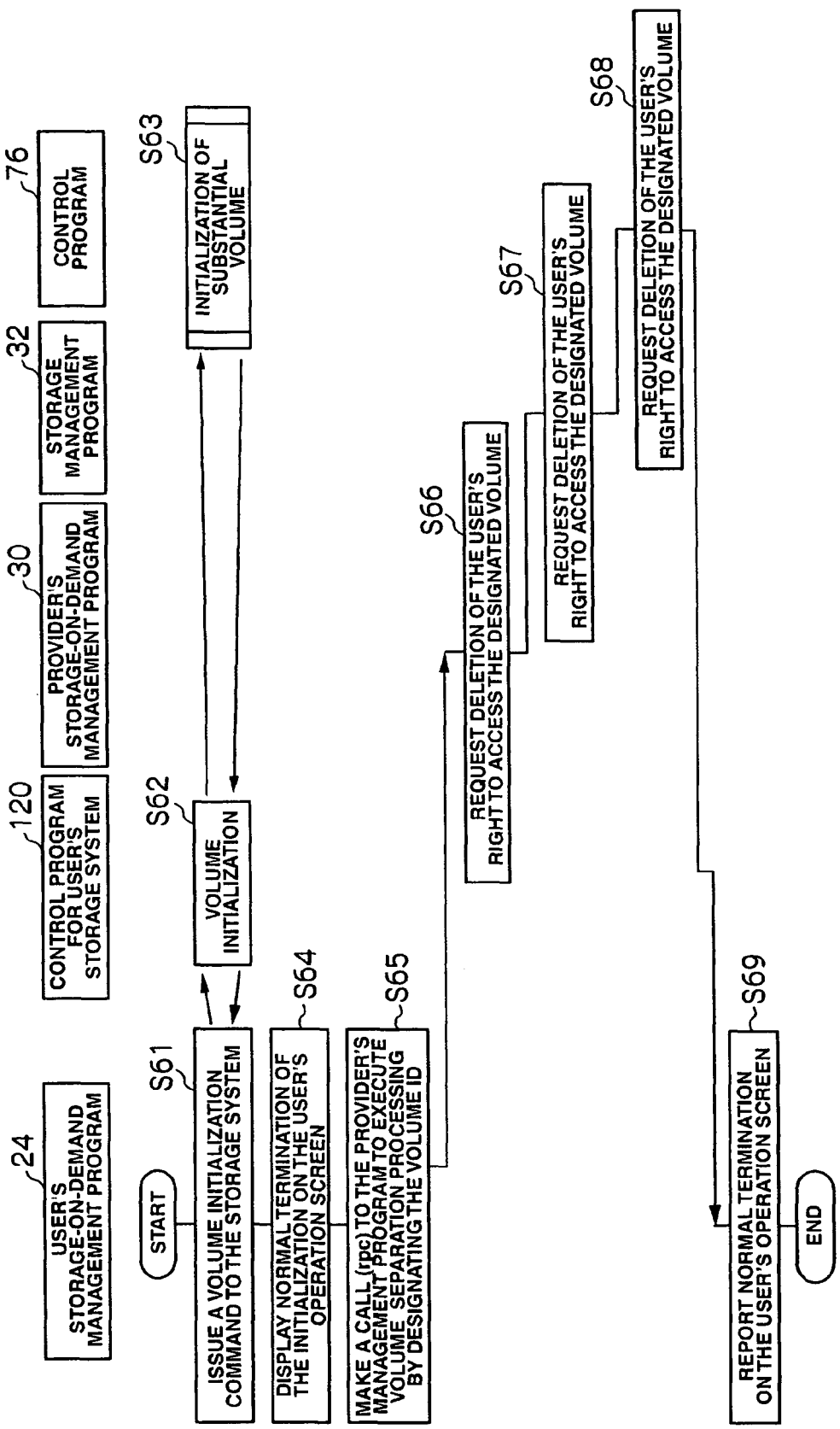
FIG. 16 is a flowchart explaining volume return processing according to the third embodiment.

Volume return processing according to the third embodiment will be described below with reference to the flowchart in FIG. 16. When receiving a volume return request, the user's storage-on-demand management program 24 issues a volume initialization command to the storage system 106 connected to the server 10 by designating a volume (S61). Here, the designated volume is not a volume actually mounted in user A's storage system 106, but is a remote volume defined in the storage system 62 of the service provider S. Subsequently, the storage system 106's control program 120 makes a request via the communication network 104 to the provider's storage system 62's control program 76 to initialize the substantial volume (S62).

The control program 76 initializes the designated volume and reports the completion of the initialization to the control program 120, the requester (S63). Upon receiving the completion report from the control program 76, the user A's control program 120 reports the completion to the user's storage-on-demand management program 24. The user's storage-on-demand management program 24 displays on the operation screen on the console terminal 18 that the volume initialization has terminated normally (S64).

Subsequently, the user's storage-on-demand management program 24 makes a request via the communication network 104 to the provider's storage-on-demand management program 30 for volume separation (S65). Upon receiving the request, the provider's storage-on-demand management program 30 makes a request to the storage management program 32 to delete the access right of user A, the requester for separation, to the designated volume (S67). The control program 76 deletes WWN registration of the connection port for the CHA 110 in the storage system 106 as a connection port for the designated volume (S68).

In other words, the control program 76 deletes the user A's access right by deleting the logical access path to the connection port for the CHA 110 of the storage system 106 as a logical access path to the designated volume. After deleting the user A's access right, the control program 76 sequentially reports the completion of the processing to the storage management program 32, the provider's storage-on-demand management program 30, and finally the user's storage-on-demand management program 24. Subsequently, the user's storage-on-demand management program 24 reports to the console terminal 18 that the volume separation processing has terminated normally, thereby terminating the processing sequence (S69).

Also in the case of the connection mode where the user A's storage system 106 is directly connected to the service provider S's storage system 62, if user A performs the operation to make a volume return request in the above-described processing, the volume initialization and the separation are performed in that order as a single continuous processing sequence. Accordingly, it is possible to avoid accidentally forgetting data deletion and ensure data security with certainty. Once user A gives a release instruction in the third embodiment, the processing for initializing and separating the volume in that order as a single continuous processing sequence is activated. However, it is also possible to adopt a method for the user to designate the volume initialization and the separation sequentially, but separately.

The designated volume can be initialized by connecting a service processor to the server 16 and manually operating this service processor or activating a management tool connected to the service processor. Also, the volume initialization can be performed by inputting a format command and a write command as initialization commands to the console 33 based on the operation of the service provider S and initializing the volume based on these commands. For the volume initialization, data patterns such as "all 0's," "all F's," and "space" can be used. A combination of different kinds of data patterns can be used to perform the initialization more than once, thereby enhancing security.

In order to initialize the storage area to be released, write and verify commands can be used to confirm, using the verify command, that initialization data including the write command has been properly written to a storage medium. If the write and verify commands terminate normally, it can be considered that the initialization of the target block for the write and verify commands has been performed properly.

In order to initialize the storage area to be released, a command, for example, a format unit command that is a SCSI (Small Computer System Interface) command can be used. When this format unit command is completed, and if the status is a "good" status, it can be considered that the initialization has been performed properly.

Regarding the initialization of the designated volume, whether or not the designated volume has been initialized or not can be managed by adding "1" to the initialized flag 60 in the volume information management table T2.

When newly assigning a volume, whether the initialized flag 60 is set to "0" or not is checked; and if the initialized flag 60 is set to "0," the volume can be assigned. In order to assign that volume again, data blocks of the volume are checked to clarify whether or not the data blocks have been initialized, using the specified initialization data.

Specifically speaking, the data blocks of the volume are read and compared with a specified initialization value to check whether the record data after initialization is "00," "FF," or "space." If this comparison shows that the initialization has not been performed completely, the entire volume or the block(s) which have not been initialized can be initialized and then assigned.

When user A returns the designated volume to the service provider S, it is effective to perform processing for checking whether the volume should be returned or not, in order to avoid forgetting to copy necessary data in the volume and returning the volume with the data remaining.

Figure 17:
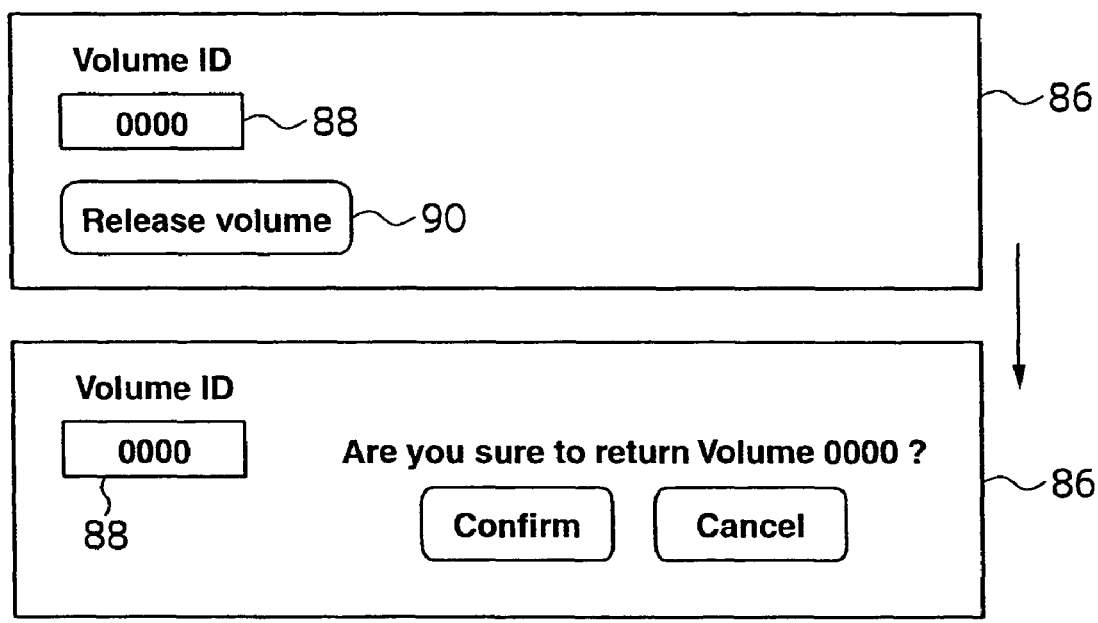
FIG. 17 shows an example of a screen to confirm whether a volume can be released or not.

Such checking can be performed by, for example, referring to the status to check whether the volume has been copied or not, or by prompting user A to confirm whether it is ok to return the volume, showing the volume number and name, and a directory and files in the volume. For example, when prompting user A's confirmation by using a screen, it is possible to adopt a method for changing the console terminal 18's operation screen 86 from the release request screen to the operation screen 86 to confirm whether the volume should be released or not, as shown in FIG. 17.

Figure 18:
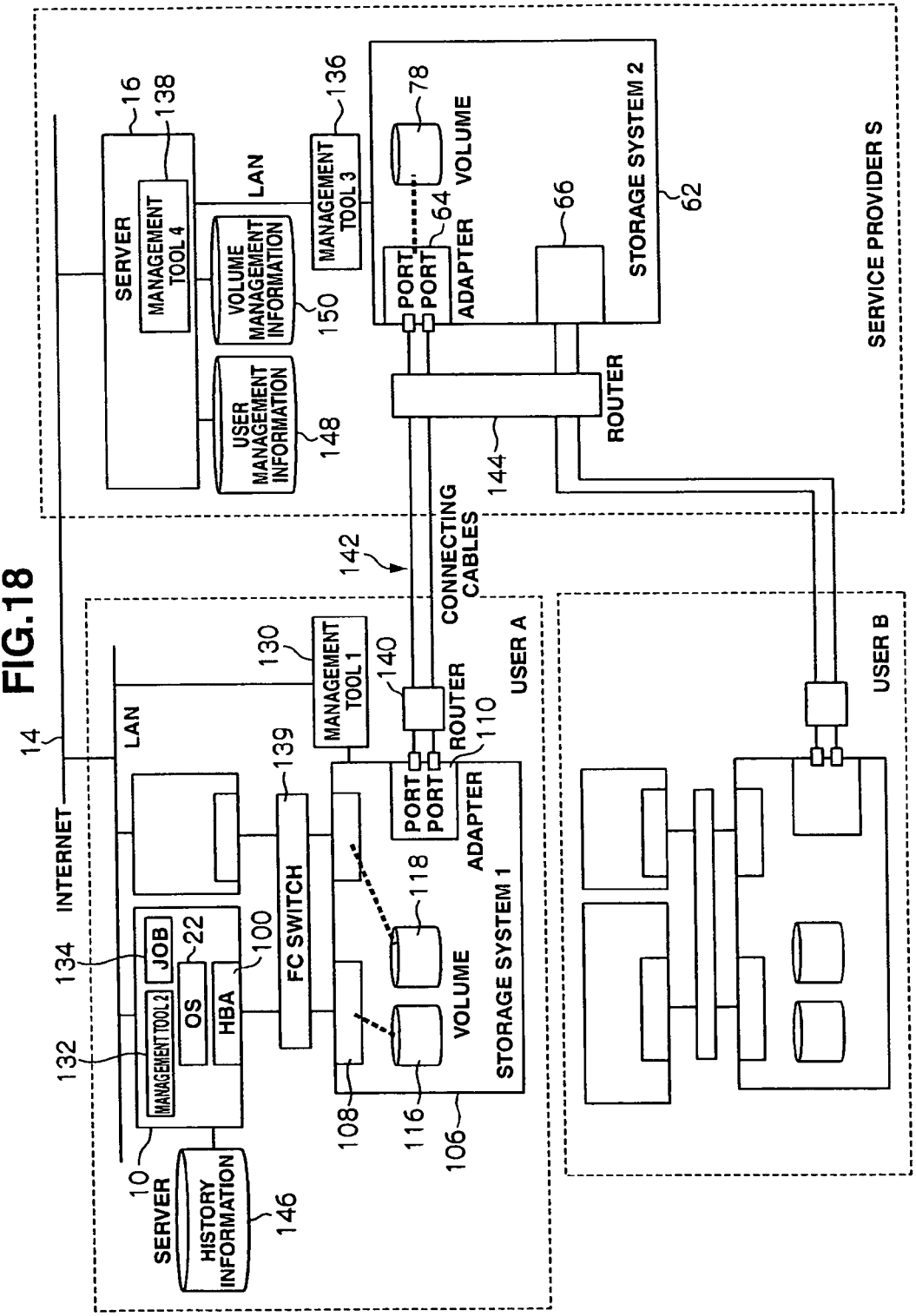
FIG. 18 is a system configuration diagram of a storage-on-demand system according to the fourth embodiment of the invention.

Next, the fourth embodiment of the invention will be described below with reference to FIG. 18. In the fourth embodiment, the user A's storage system 106 is connected to a first management tool 130; this management tool 130 is connected to the communication network 14; the server 10 is provided with a second management tool 132 and a job 134; the HBA 100 of the server 10 is connected via an FC (Fibre Channel) switch 139 to the CHA 108 of the storage system 106; a third management tool 136 is provided on a LAN connecting the service provider S's storage system 62 and the server 16; a fourth management tool 138 is provided in the server 16; and the CHA 110 in user A's storage system 106 is connected via a router 140, connecting cables 142, and a router 144 to the CHA 64 in the storage system 62. Otherwise, the configuration of the fourth embodiment is similar to that of the third embodiment. Incidentally, the server 10 is connected to a database 146 for storing history information, and the server 16 is connected to a database 148 for storing user management information and a database 150 for storing volume management information.

Figure 19:
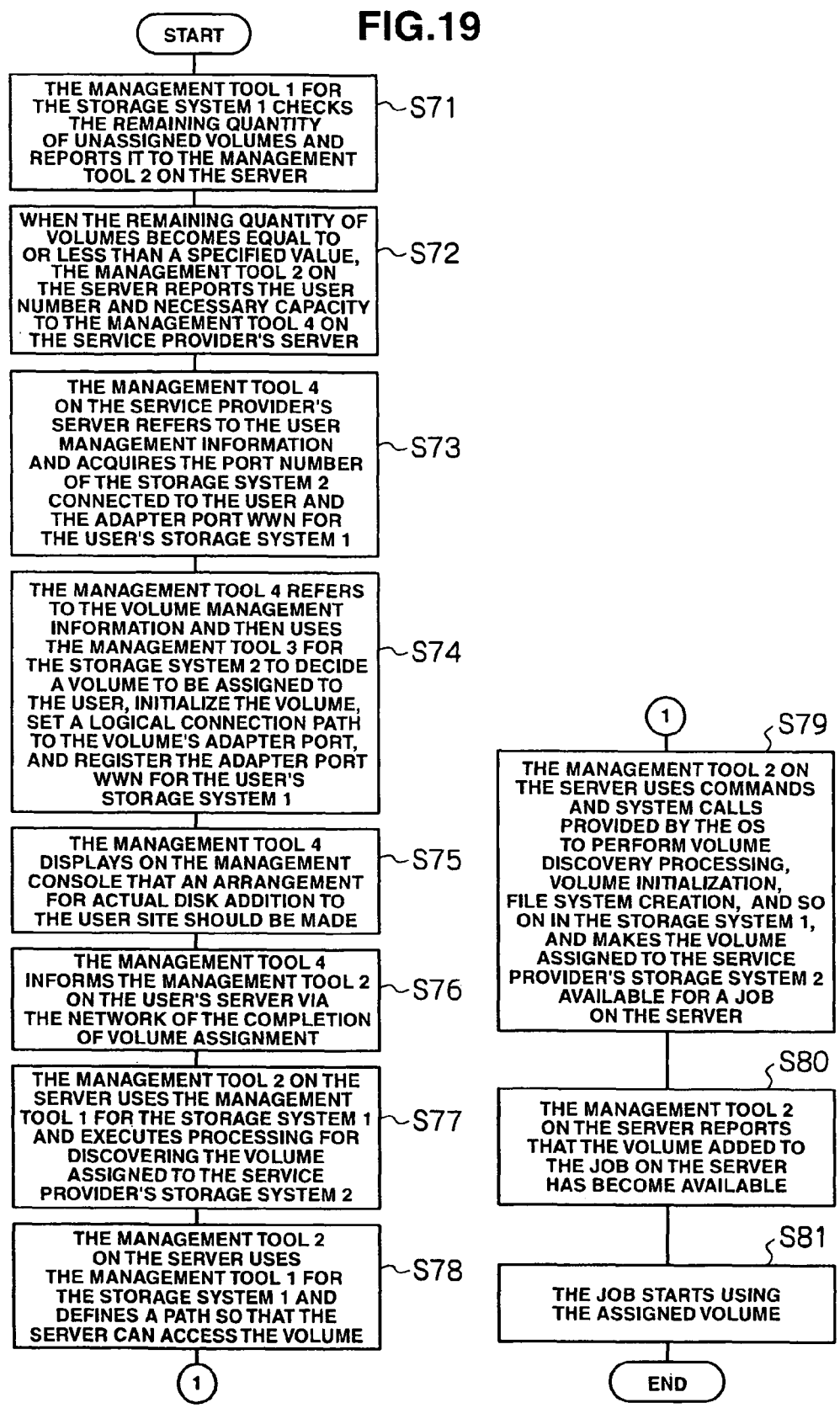
FIG. 19 is a flowchart explaining automatic storage area assignment processing according to the fourth embodiment.

Automatic storage assignment processing according to the fourth embodiment will be described below with reference to the flowchart in FIG. 19. In order to automatically assign the storage system 62, the first management tool 130 checks the remaining quantity of unassigned volumes and reports it to the second management tool 132 on the server 10 (S71). If the remaining quantity of volumes becomes equal to or less than a specified value, the second management tool 132 reports the user number and necessary capacity via the communication network 14 to the fourth management tool 138 on the server 16 of the service provider S (S72).

Subsequently, the fourth management tool 138 refers to the user management information of the database 148 and acquires the port number of the storage system 106 connected to user A and the WWN of the port for the user A's CHA (channel adapter) 110 (S73). Furthermore, the fourth management tool 138 refers to the user management information in the database 148 and then uses the third management tool 136 to decide a volume to be assigned to user A, initialize the volume, set a logical connection path to the volume's adapter (CHA 64) port, and register the adapter (CHA 110) port WWN for the storage system 106 (S74). Also, the fourth management tool 138 displays on the console 33 that the actual installment of additional disks to the user site should be arranged (S75). Furthermore, the fourth management tool 138 reports the completion of volume assignment via the network to the second management tool 132 on the server 10 (S76).

Next, the second management tool 132 on the server 10 performs processing for discovering the volume assigned to the storage system 62 of the service provider S, using the first management tool 130 (S77). The second management tool 132 then defines a path, using the first management tool 130 in the storage system 106, so that the server 10 can access the volume (S78). Subsequently, the second management tool 132 on the server 10 uses commands and system calls provided by the OS 22 to perform volume discovery processing, volume initialization, file system creation, and so on in the storage system 106, and makes the volume assigned to the service provider S's storage system 62 available for the job 134 on the server (S79). Next, the second management tool 132 on the server 10 reports to the console terminal 18 that the volume added to the job 134 on the server 10 has become available (S80). Subsequently, the job 134 starts using the assigned volume, thereby terminating the processing of this routine (S81).

After the processing for automatically assigning the storage system 62 is executed via the network, data with low use frequency and data for which comparatively low access performance may be acceptable, from among data in the storage system 106 at the user site are migrated via the network to the storage system 62. Accordingly, it is possible to avoid a processing halt due to a shortage of storage areas in the storage system 106.

Figure 20:
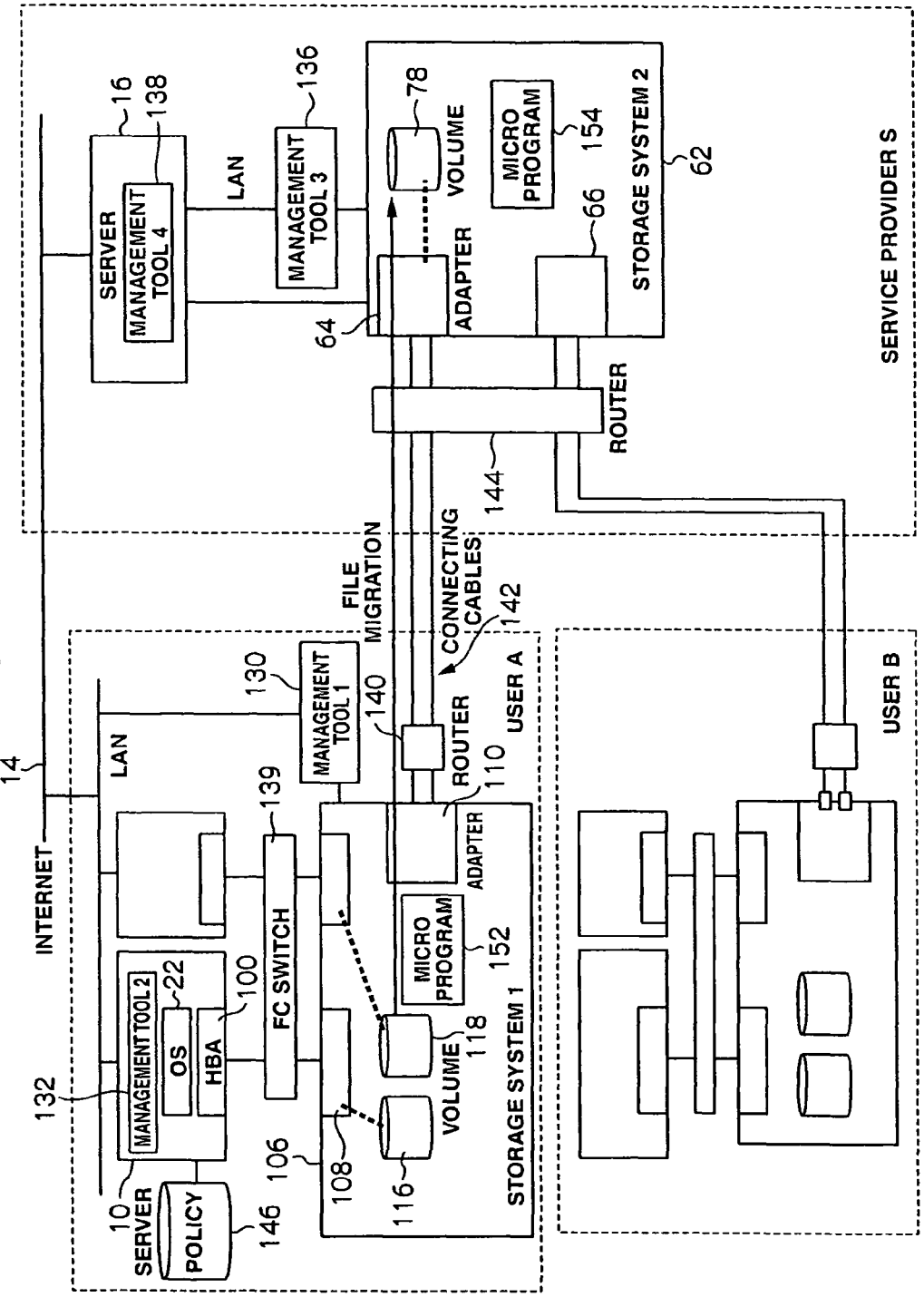
FIG. 20 is a system configuration diagram of a storage-on-demand system according to the fifth embodiment of the invention.

Next, the fifth embodiment of the present invention will be described with reference to FIG. 20. In the fifth embodiment, the storage system 106 includes a microprogram 152 and the storage system 62 includes a microprogram 154. Otherwise, the configuration of the fifth embodiment is similar to that of the fourth embodiment.

Figure 21:
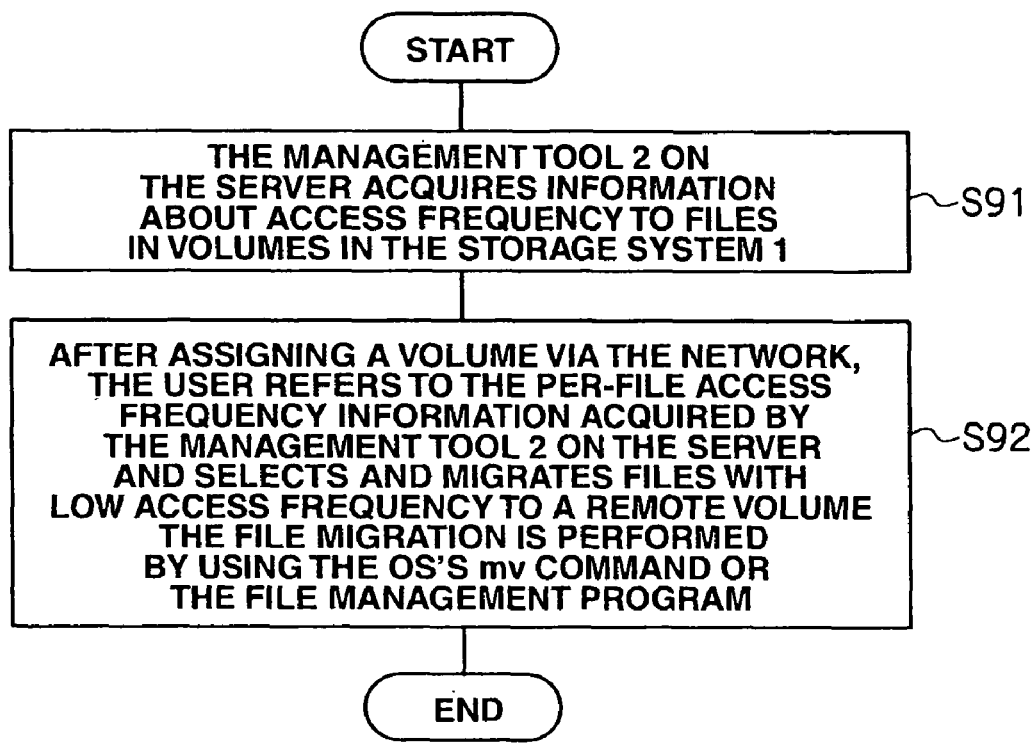
FIG. 21 is a flowchart explaining user-initiated file migration processing according to the fifth embodiment.

File migration processing executed by the user's operation according to the fifth embodiment will be described below with reference to the flowchart of FIG. 21. In order to migrate files, the second management tool 132 on the server 10 acquires information about access frequency to files in volumes in the storage system 106 (S91). After assigning a volume via the network, user A refers to the per-file access frequency information acquired by the second management tool 132 on the server 10 and performs the operation to select and migrate files with low access frequency to a remote volume (a volume in the storage system 62). This file migration is performed by using the OS 22's mv (move) command and a file management program (S92).

Figure 22:
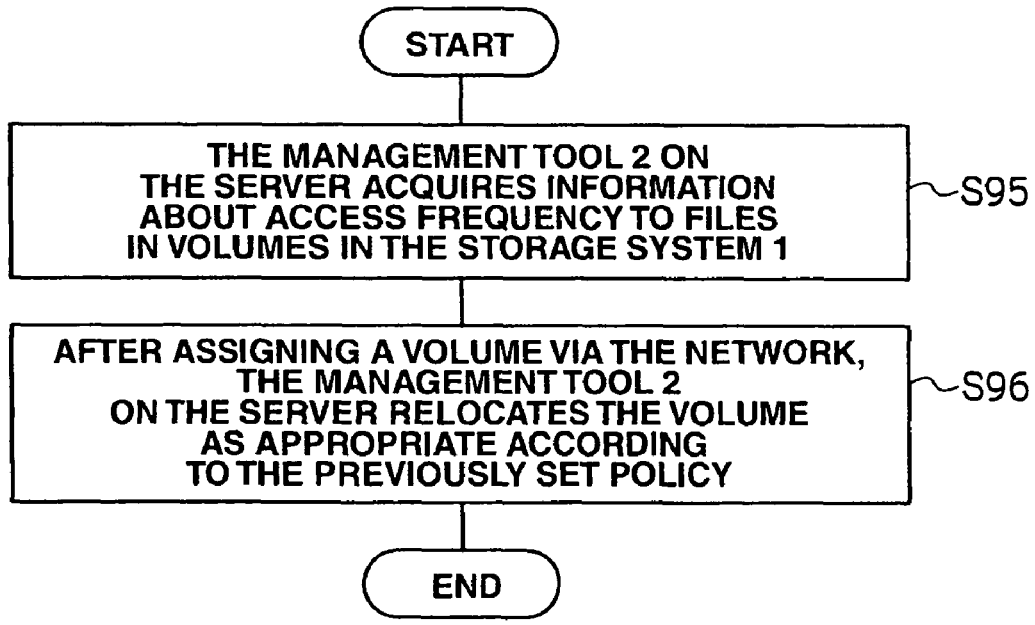
FIG. 22 is a flowchart explaining automatic file migration processing according to the policy according to the fifth embodiment.

Next, automatic file migration processing according to the policy stored in the database 162 will be described below with reference to the flowchart in FIG. 22. The second management tool 132 on the server 10 acquires information about access frequency to files in volumes in the storage system 106 (S95). The second-management tool 132 on the server 10 assigns a volume via the network and then relocates the volume as appropriate according to the previously set policy, thereby terminating the processing of this routine (S96).

Figure 23:
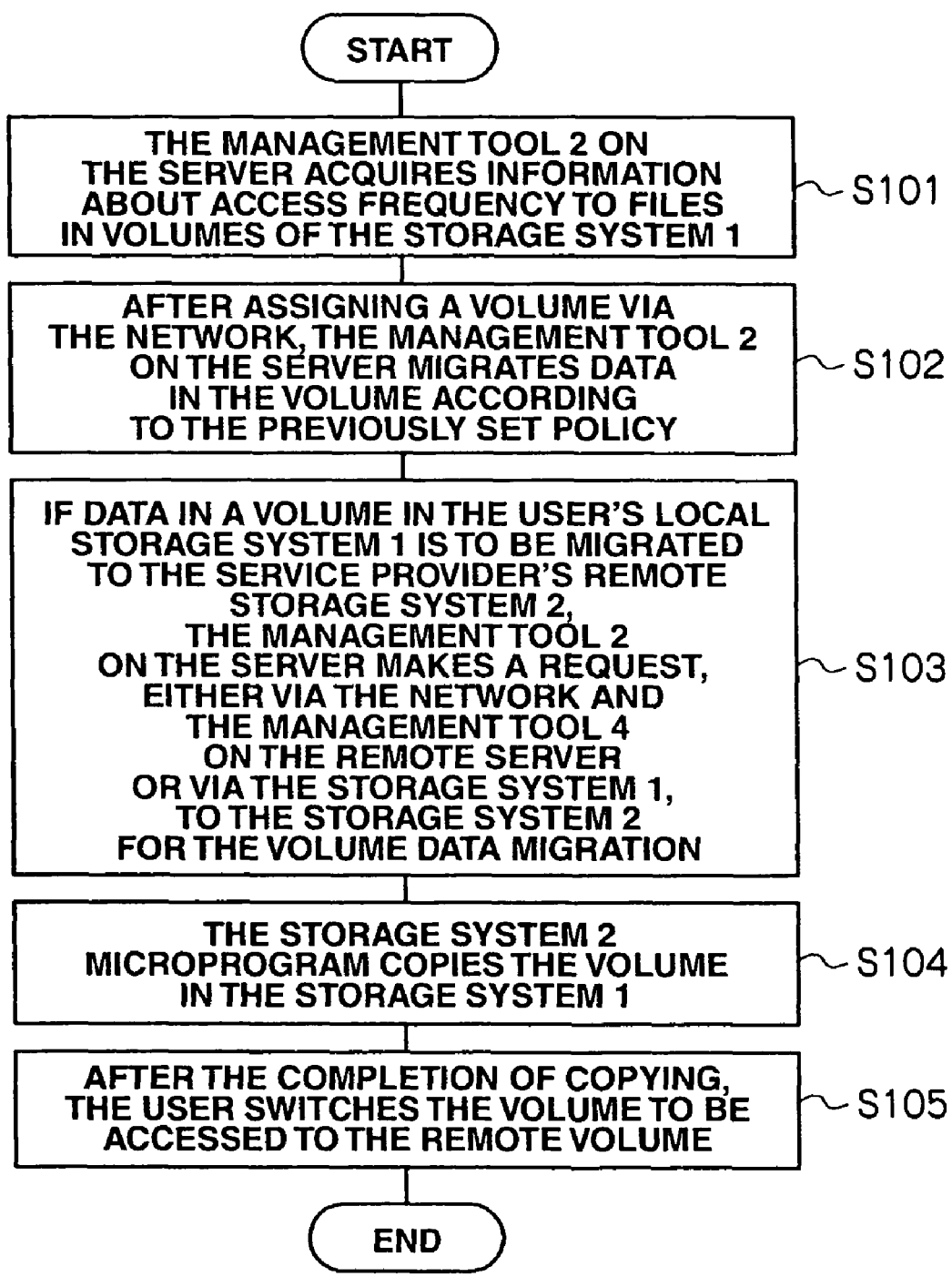
FIG. 23 is a flowchart explaining data read processing according to the fifth embodiment.

Data read processing executed by a service provider S storage system will be described below with reference to the flowchart in FIG. 23. First, the second management tool 132 on the server 10 acquires information about access frequency to files in volumes in the storage system 106 (S101). Subsequently, the second management tool 132 on the server 10 assigns a volume via the network and then migrates data in the volume according to the previously set policy (S102). If data in a volume in the user's local storage system 106 is to be migrated to the service provider S's remote storage system 62, the management tool 132 on the server 10 makes a request, either via the network and the fourth management tool 138 or via the storage system 106, to the storage system 62 for the volume data migration (S103).

Subsequently, the storage system 62's microprogram 154 copies the volume in the storage system 106 according to the microprogram 152 (S104). After the completion of copying, user A switches the volume to be accessed to a remote volume, thereby terminating the processing of this routine (S105).

The processing described above makes it possible to read data from the service provider S's storage system 62 in order to reduce the load on a controller microprocessor in the user A's storage system 106.

Figure 24:
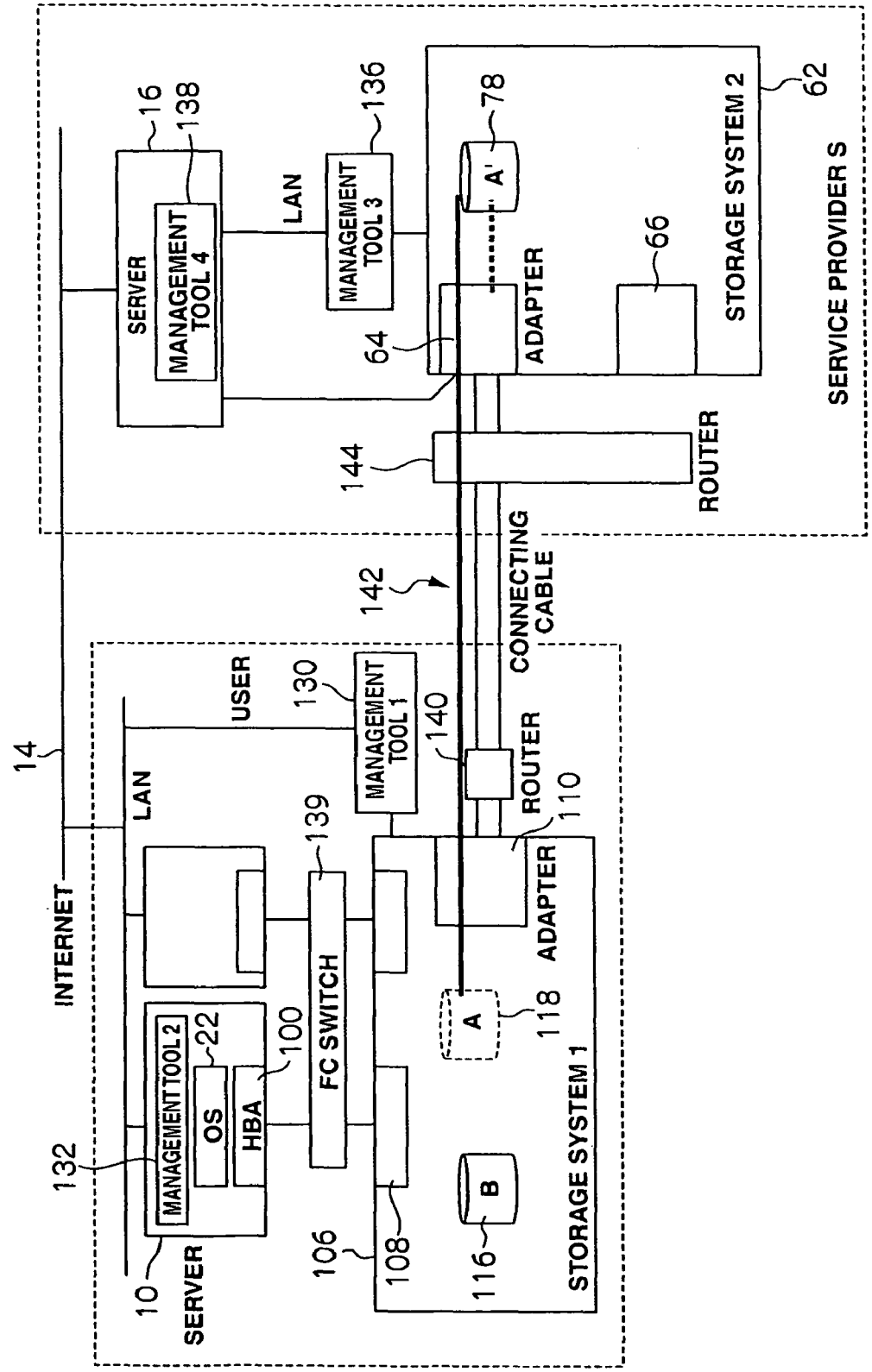
FIG. 24 is a system configuration diagram of a storage-on-demand system according to the sixth embodiment of the invention.

Next, the sixth embodiment of the invention will be described with reference to FIG. 24. In the sixth embodiment, the volume assigned to the disk drive 118 in the storage system 106 is considered a volume image A, the volume assigned to the disk drive 116 is considered volume B, and the volume assigned to the disk drive 78 in the service provider S's storage system is considered a primary volume A'. Otherwise, the configuration of the sixth embodiment is similar to that of the fourth embodiment.

Now, processing for activating automatic storage switching processing after the installment of additional storage areas will be described below with reference to the flowchart in FIG. 25. In order to automatically switch from the network storage system to the local storage system after the installment of additional storage areas in the user A's site, the first management tool 130 reports the additional disk installment completion status to the second management tool 132 after the completion of additional disk installment in the user A's storage system 106 (S111). Then, the second management tool 132 starts a script to execute the following processing (S112). Next, the second management tool 132 designates the remote volume A' currently used by user A as a primary volume and the added local volume B as a secondary volume, and pairs them with each other as a volume pair (S113). The second management tool 132 then synchronizes the volume pair and matches the content of the secondary volume B with that of the primary volume A' (S114).

Subsequently, the second management tool 132 freezes the job 134 accessing the remote volume A' (S115). The second management tool 132 then switches the volume image A presented by the storage system 106's control program 120 to the server 10 from the remote volume A' to the local volume B (S116). Subsequently, the second management tool 132 separates the volume pair (S117) and unfreezes the job 134 (S118).

Next, the second management tool 132 initializes the remote volume A' and deletes the volume image A, using the first management tool 130 (S119). The second management tool 132 then reports the status to the fourth management tool 138 on the service provider S's server 16 (S120). The fourth management tool 138 performs processing via the third management tool 136 for separating the assigned volume from user A, thereby terminating the processing in this routine (S121).

If the capacity of the storage system 106 at the user site has become deficient when the on-demand service of the storage system 62 is provided as described above, it is possible to readily assign a common storage area of the service provider S to user A via the network and avoid a processing halt due to a shortage in storage areas in the storage system 106. If an extra storage system is installed in advance at the user site in the case described above, the installment cost will be expensive. However, by also using the storage areas assigned via the network, it is possible to reduce the necessary cost for the storage on-demand service.

When returning the storage area used by user A to the service provider S, it is necessary to prevent the data recorded by user A from being read by other people or leaking out. Accordingly, when user A returns the storage area, the processing for initializing the storage area and the processing for separating the storage area are executed in that order as a single continuous processing sequence and it is thereby possible to avoid forgetting the data initialization, prevent data leakage, and ensure data security with certainty.

Figure 25:
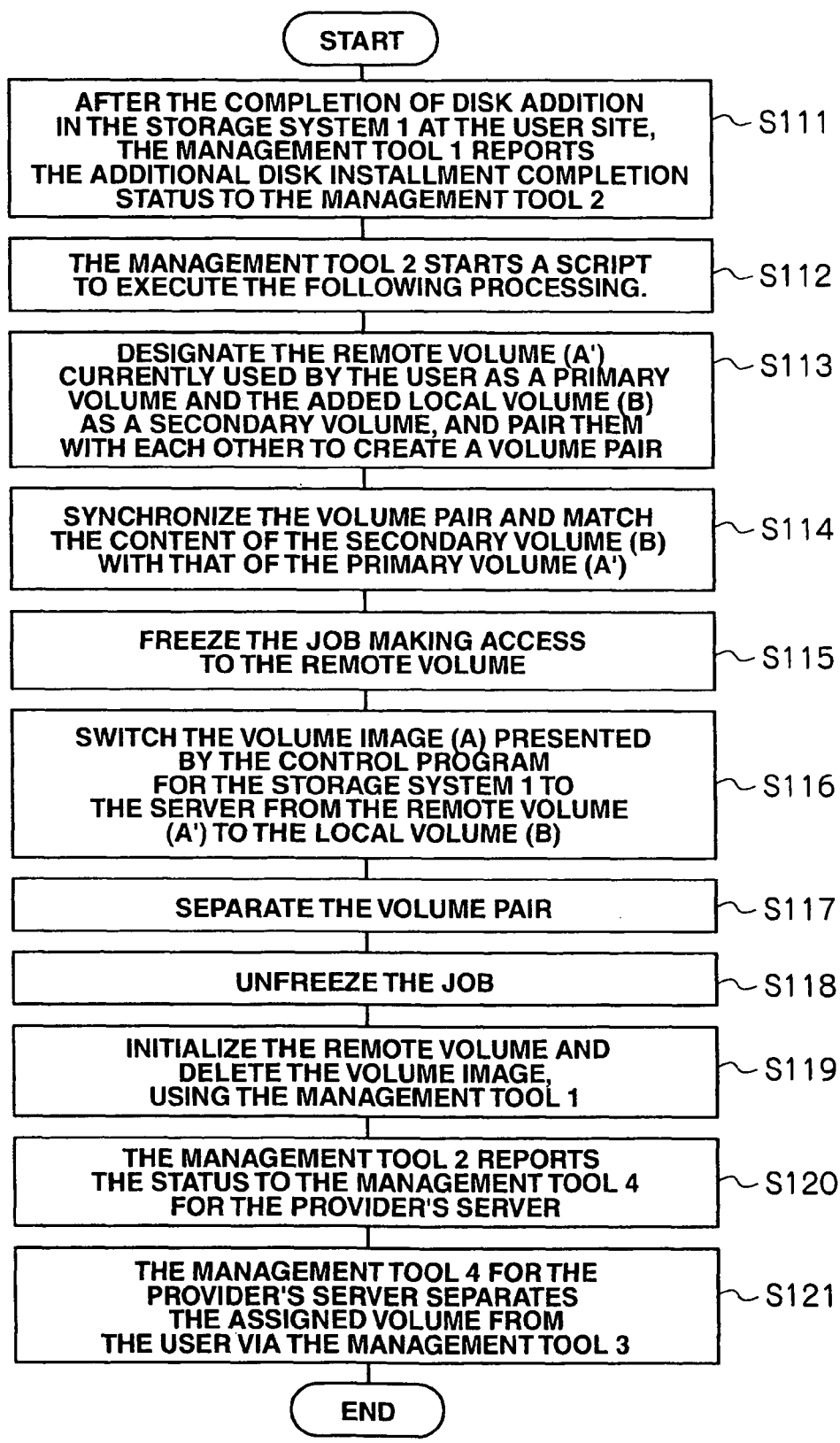
FIG. 25 is a flowchart explaining automatic storage switching processing according to the sixth embodiment.

When executing the processing for automatically switching from the network storage system to the local storage system after the installment of additional storage areas in the user site, steps S131 to S134 in FIG. 26 similar to steps S111 to S114 in FIG. 25 can be performed; and then in step S135 processing for setting the copied flag in the volume A' entry in the management table for the remote volume A' can be executed.

In this case, the same processing as that in steps S115 to S118 in FIG. 25 is executed from step S136 to step S139; and then at step S140, user A confirms whether the data has been copied or not, by checking the copied flag in the management table before returning the remote volume A'. If the data has not been copied, error recovery processing is executed; and if the data has been copied, the second management tool 132 initializes the remote volume A' and deletes the volume image A, using the first management tool 130 (S141). Subsequently, the second management tool 132 sends the status to the fourth management tool 138 for the service provider S's server 16 (S142).

The fourth management tool 138 then separates the assigned volume from user A via the third management tool 136, thereby terminating the processing of this routine (S143). As described above, it is possible to avoid a processing halt due to a shortage of storage areas in the storage system by automatically switching from the network storage system to the local storage system after the installment of additional storage areas in the user site.

What is claimed is:

1. A method for processing data in a storage-on-demand system that provides some storage areas of a storage system to a user terminal upon a request from a user of the user terminal, the method comprising:
configuring at least one processor device to perform the functions of:
a first step of, upon a return request from the user to release a designated volume identified by a volume id and a volume capacity, initializing the designated volume from among volumes assigned to the storage-on-demand system by deleting the user's data from the designated volume that has been copied; and
a subsequent second step of nullifying the right to access the designated volume in response to the return request to release the designated volume by deleting the user's access rights to the designated volume so that the user's data can never be read or viewed by new users.

2. The method for processing data in the storage-on-demand system according to claim 1, wherein the second step is executed after the first step as part of a single continuous processing sequence.

3. A method for processing data in a storage-on-demand system that provides some storage areas of a storage system to a user terminal upon a request from a user of the user terminal, the method comprising:
configuring at least one processor device to perform the functions of:
a first step of requesting input to indicate whether a designated volume identified by a volume id and a volume capacity from among volumes assigned to the storage-on-demand system has been copied or not, in response to a return request from the user to release the designated volume; subsequently,
a second step of initializing the designated volume by deleting the user's data from the designated volume in response to input indicating that data on the designated volume has been copied; and subsequently,
a third step of nullifying the right to access the designated volume by deleting the user's access rights to the designated volume in response to the input indicating that the designated volume has been copied.

4. A storage-on-demand system for transferring information via a communication network between a user's server connected to a user terminal and a management server for managing a storage system, and providing some storage areas of the storage system to the user terminal upon a request from a user of the user terminal,
wherein the user's server includes:
a return request processing unit for executing return request processing by a processor on the server when receiving a return request from the user to release a designated volume identified by a volume id and a volume capacity from among volumes assigned to the storage system from the user terminal; and
a user communication unit for sending the return request processed by the return request processing unit, via the communication network to the management server; and
wherein the management server includes:
a management server communication unit for receiving the return request;
an initialization processing unit for initializing the designated volume of the storage-on-demand system by deleting the user's data from the designated volume that has been copied in response to the return request received by the management server communication unit; and
an access right processing unit for nullifying an access right to the designated volume by deleting the user's access rights to the designated volume so that the user's data can never be read or viewed by new users; and
wherein the management server communication unit sends the processing results from the initialization processing unit and the access right processing unit respectively via the communication network to the user communication unit.

5. The storage-on-demand system according to claim 4, wherein the user's server includes a user terminal processing unit for having the user terminal display a screen to request input indicating whether the designated volume has been copied or not, in accordance with the return request to release the designated volume from among the volumes assigned to the storage system; and
wherein the return request processing unit outputs the return request to the server on the condition that it receives the input from the user terminal indicating that the designated volume has been copied.

6. The storage-on-demand system according to claim 4, wherein the user communication unit has the user terminal display, on its operation screen, the processing results for the initialization processing unit and the access right processing unit, which are sent from the management server communication unit.

* * * * *